US012682447B2

(12) United States Patent
Iwano

(10) Patent No.: US 12,682,447 B2
(45) Date of Patent: Jul. 14, 2026

(54) INSPECTION APPARATUS THAT EXTRACTS A PREDETERMINED AREA, INSPECTION METHOD, AND STORAGE MEDIUM

(71) Applicant: CANON KABUSHIKI KAISHA, Tokyo (JP)

(72) Inventor: Shunsuke Iwano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 411 days.

(21) Appl. No.: 18/346,305

(22) Filed: Jul. 3, 2023

(65) Prior Publication Data

US 2024/0013372 A1 Jan. 11, 2024

(30) Foreign Application Priority Data

Jul. 5, 2022 (JP) ................................ 2022-108529

(51) Int. Cl.

| | |
|---|---|
| *G06T 7/00* | (2017.01) |
| *G06T 3/40* | (2024.01) |
| *G06T 5/70* | (2024.01) |
| *G06T 5/77* | (2024.01) |
| *G06V 10/56* | (2022.01) |

(52) U.S. Cl.

CPC ................ *G06T 7/001* (2013.01); *G06T 3/40* (2013.01); *G06T 5/70* (2024.01); *G06T 5/77* (2024.01); *G06V 10/56* (2022.01); *G06T 2207/10024* (2013.01); *G06T 2207/30144* (2013.01)

(58) Field of Classification Search

None

See application file for complete search history.

(56) References Cited

U.S. PATENT DOCUMENTS

2013/0222823 A1 * 8/2013 Hyoki ................. H04N 1/6066 358/1.9

FOREIGN PATENT DOCUMENTS

JP 2018155736 A * 10/2018

* cited by examiner

*Primary Examiner* — Andrew M Moyer
*Assistant Examiner* — Caroline E. Depalma
(74) *Attorney, Agent, or Firm* — ROSSI, KIMMS & McDOWELL LLP

(57) ABSTRACT

From one of an inspection image of a printed material and a reference image, a predetermined area including an edge is extracted and a pixel value of a pixel is corrected, which configures the predetermined area in the inspection image or the reference image, from which the predetermined area has been extracted, and a blot on the printed material is detected by using collation results of the corrected inspection image and the reference image and a threshold value, or by using collation results of the inspection image and the corrected reference image and the threshold value.

16 Claims, 20 Drawing Sheets

| | X11 | X12 | X13 | X14 | X15 | X16 | X17 | X18 | X19 | X20 |
|---|---|---|---|---|---|---|---|---|---|---|
| REFERENCE IMAGE (WITHOUT CORRECTION) | 0 | 0 | 0 | 0 | 0 | 255 | 255 | 255 | 255 | 255 |
| SCANNED IMAGE (IDEAL) | 0 | 0 | 0 | 0 | 0 | 255 | 255 | 255 | 255 | 255 |
| DIFFERENCE | 0 | 0 | 0 | 0 | 0 | 0 | 0 | 0 | 0 | 0 |

| | X11 | X12 | X13 | X14 | X15 | X16 | X17 | X18 | X19 | X20 |
|---|---|---|---|---|---|---|---|---|---|---|
| REFERENCE IMAGE (WITHOUT CORRECTION) | 0 | 0 | 0 | 0 | 0 | 255 | 255 | 255 | 255 | 255 |
| SCANNED IMAGE (MISALIGNMENT) | 0 | 0 | 0 | 0 | 0 | 0 | 150 | 255 | 255 | 255 |
| DIFFERENCE | 0 | 0 | 0 | 0 | 0 | 255 | 105 | 0 | 0 | 0 |

| | X11 | X12 | X13 | X14 | X15 | X16 | X17 | X18 | X19 | X20 |
|---|---|---|---|---|---|---|---|---|---|---|
| REFERENCE IMAGE (WITHOUT CORRECTION) | 0 | 0 | 0 | 0 | 0 | 255 | 255 | 255 | 255 | 255 |
| SCANNED IMAGE (NOISE) | 0 | 0 | 120 | 100 | 105 | 255 | 255 | 255 | 255 | 255 |
| DIFFERENCE | 0 | 0 | 120 | 100 | 105 | 0 | 0 | 0 | 0 | 0 |

| | X11 | X12 | X13 | X14 | X15 | X16 | X17 | X18 | X19 | X20 |
|---|---|---|---|---|---|---|---|---|---|---|
| REFERENCE IMAGE (WITHOUT CORRECTION) | 0 | 0 | 0 | 0 | 0 | 255 | 255 | 255 | 255 | 255 |
| SCANNED IMAGE (MISALIGNMENT + NOISE) | 0 | 0 | 0 | 0 | 120 | 100 | 105 | 255 | 255 | 255 |
| DIFFERENCE | 0 | 0 | 0 | 0 | 120 | 155 | 150 | 0 | 0 | 0 |

| | X11 | X12 | X13 | X14 | X15 | X16 | X17 | X18 | X19 | X20 |
|---|---|---|---|---|---|---|---|---|---|---|
| REFERENCE IMAGE (SMOOTHED) | 0 | 0 | 3 | 27 | 87 | 167 | 227 | 251 | 255 | 255 |
| SCANNED IMAGE (MISALIGNMENT) | 0 | 0 | 0 | 0 | 0 | 0 | 150 | 255 | 255 | 255 |
| DIFFERENCE | 0 | 0 | 3 | 27 | 87 | 167 | 77 | 4 | 0 | 0 |

| | X11 | X12 | X13 | X14 | X15 | X16 | X17 | X18 | X19 | X20 |
|---|---|---|---|---|---|---|---|---|---|---|
| REFERENCE IMAGE (SMOOTHED) | 0 | 0 | 3 | 27 | 87 | 167 | 227 | 251 | 255 | 255 |
| SCANNED IMAGE (NOISE) | 0 | 0 | 120 | 100 | 105 | 255 | 255 | 255 | 255 | 255 |
| DIFFERENCE | 0 | 0 | 117 | 73 | 18 | 88 | 28 | 4 | 0 | 0 |

| | X11 | X12 | X13 | X14 | X15 | X16 | X17 | X18 | X19 | X20 |
|---|---|---|---|---|---|---|---|---|---|---|
| REFERENCE IMAGE (SMOOTHED) | 0 | 0 | 3 | 27 | 87 | 167 | 227 | 251 | 255 | 255 |
| SCANNED IMAGE (MISALIGNMENT + NOISE) | 0 | 0 | 0 | 0 | 120 | 100 | 105 | 255 | 255 | 255 |
| DIFFERENCE | 0 | 0 | 3 | 27 | 33 | 67 | 122 | 4 | 0 | 0 |

| | X11 | X12 | X13 | X14 | X15 | X16 | X17 | X18 | X19 | X20 |
|---|---|---|---|---|---|---|---|---|---|---|
| REFERENCE IMAGE (NOISE APPENDED) | 0 | 0 | 69 | 40 | 80 | 158 | 208 | 180 | 255 | 255 |
| SCANNED IMAGE (MISALIGNMENT) | 0 | 0 | 0 | 0 | 0 | 0 | 150 | 255 | 255 | 255 |
| DIFFERENCE | 0 | 0 | 69 | 40 | 80 | 158 | 58 | 75 | 0 | 0 |

| | X11 | X12 | X13 | X14 | X15 | X16 | X17 | X18 | X19 | X20 |
|---|---|---|---|---|---|---|---|---|---|---|
| REFERENCE IMAGE (NOISE APPENDED) | 0 | 0 | 69 | 40 | 80 | 158 | 208 | 180 | 255 | 255 |
| SCANNED IMAGE (NOISE) | 0 | 0 | 120 | 100 | 105 | 255 | 255 | 255 | 255 | 255 |
| DIFFERENCE | 0 | 0 | 51 | 60 | 25 | 97 | 47 | 75 | 0 | 0 |

| | X11 | X12 | X13 | X14 | X15 | X16 | X17 | X18 | X19 | X20 |
|---|---|---|---|---|---|---|---|---|---|---|
| REFERENCE IMAGE (NOISE APPENDED) | 0 | 0 | 69 | 40 | 80 | 158 | 208 | 180 | 255 | 255 |
| SCANNED IMAGE (MISALIGNMENT + NOISE) | 0 | 0 | 0 | 0 | 120 | 100 | 105 | 255 | 255 | 255 |
| DIFFERENCE | 0 | 0 | 69 | 40 | 40 | 58 | 103 | 75 | 0 | 0 |

| | X11 | X12 | X13 | X14 | X15 | X16 | X17 | X18 | X19 | X20 |
|---|---|---|---|---|---|---|---|---|---|---|
| REFERENCE IMAGE (SMOOTHED→NOISE APPENDED) | 0 | 0 | 72 | 67 | 167 | 70 | 180 | 176 | 255 | 255 |
| SCANNED IMAGE (MISALIGNMENT) | 0 | 0 | 0 | 0 | 0 | 0 | 150 | 255 | 255 | 255 |
| DIFFERENCE | 0 | 0 | 72 | 67 | 167 | 70 | 30 | 79 | 0 | 0 |

| | X11 | X12 | X13 | X14 | X15 | X16 | X17 | X18 | X19 | X20 |
|---|---|---|---|---|---|---|---|---|---|---|
| REFERENCE IMAGE (SMOOTHED→NOISE APPENDED) | 0 | 0 | 72 | 67 | 167 | 70 | 180 | 176 | 255 | 255 |
| SCANNED IMAGE (NOISE) | 0 | 0 | 120 | 100 | 105 | 255 | 255 | 255 | 255 | 255 |
| DIFFERENCE | 0 | 0 | 48 | 33 | 62 | 185 | 75 | 79 | 0 | 0 |

| | X11 | X12 | X13 | X14 | X15 | X16 | X17 | X18 | X19 | X20 |
|---|---|---|---|---|---|---|---|---|---|---|
| REFERENCE IMAGE (SMOOTHED→NOISE APPENDED) | 0 | 0 | 72 | 67 | 167 | 70 | 180 | 176 | 255 | 255 |
| SCANNED IMAGE (MISALIGNMENT + NOISE) | 0 | 0 | 0 | 0 | 120 | 100 | 105 | 255 | 255 | 255 |
| DIFFERENCE | 0 | 0 | 72 | 67 | 47 | 30 | 75 | 79 | 0 | 0 |

INSPECTION APPARATUS THAT EXTRACTS A PREDETERMINED AREA, INSPECTION METHOD, AND STORAGE MEDIUM

BACKGROUND

Field

The present invention relates to a technique to inspect the quality of an image formed on a printed material output from a printing apparatus.

Description of the Related Art

There is a technique to inspect the quality of an image formed on a printed material by using collation results obtained by collating a scanned image (inspection image) obtained by scanning the printed material and a reference image that is taken as a reference in inspection after performing alignment of them and a threshold value.

A scanned image is affected by print misalignment during printing and noise during a scan and there is a case where small misalignment remains between a reference image and a scanned image even after alignment. Particularly, in an area in which there is a steep change in luminance, which is represented by a dark portion in the vicinity of an image edge, the difference in luminance caused by misalignment is likely to become large. Further, the noise during a scan is emphasized by an increase in luminance of the dark portion by gamma correction and the variation of luminance is also likely to become large. As a result of that, despite that no image defect has occurred in the image in fact, there is a possibility that the difference in luminance due to misalignment caused in the image collation processing is detected as an image defect. Various techniques to prevent an erroneous detection in the image edge portion such as this have been discussed.

In this regard, Japanese Patent Laid-Open No. 2018-155736 has disclosed a method of inspecting a printed material by correcting a threshold value based on the densities of a pixel in the edge area of the reference image of the printed material or in the area in the vicinity thereof and the pixel of interest and the distance between the pixel and the pixel of interest, and based on the corrected threshold value and a difference image between the reference image and a read image of the printed material.

SUMMARY

However, with the method of Japanese Patent Laid-Open No. 2018-155736, overdetection is suppressed by correcting the threshold value, and therefore, even in a case where there is an image defect that is desired to be detected originally in the dark portion in the vicinity of the edge area of the read image, there is a possibility that the image defect is not detected and overlooked.

The present invention provides a technique to inspect a predetermined area including an edge in a printed material with a high accuracy.

The inspection apparatus according to one aspect of the present invention is an inspection apparatus that inspects a printed material, including: an extraction unit configured to extract a predetermined area including an edge from one of an inspection image obtained by reading the printed material and a reference image that is taken as a reference in the inspection; a first correction unit configured to correct a pixel value of a pixel configuring the predetermined area in the inspection image or the reference image, from which the predetermined area has been extracted by the extraction unit; and a detection unit configured to detect a blot on the printed material by using collation results of collating the inspection image and the reference image and a threshold value for detecting a blot on the printed material, wherein the detection unit detects: a blot on the printed material by using collation results of collating the inspection image in which the pixel value of the pixel in the predetermined area is corrected and the reference image as the collation results in a case where the pixel value of the pixel in the predetermined area is corrected in the inspection image by the first correction unit; and a blot on the printed material by using collation results of collating the reference image in which the pixel value of the pixel in the predetermined area is corrected and the inspection image as the collation results in a case where the pixel value of the pixel in the predetermined area is corrected in the reference image by the first correction unit.

Further features of the present invention will become apparent from the following description of exemplary embodiments with reference to the attached drawings.

DESCRIPTION OF THE EMBODIMENTS

In the following, with reference to the attached drawings, embodiments of the technique of the present invention are explained in detail. The following embodiments are not intended to limit the technique of the present invention according to the claims and all combinations of features explained in the present embodiments are not necessarily indispensable to the solution of the technique of the present invention. The same reference number is attached to the same component and explanation thereof is omitted.

First Embodiment

Figure 1:
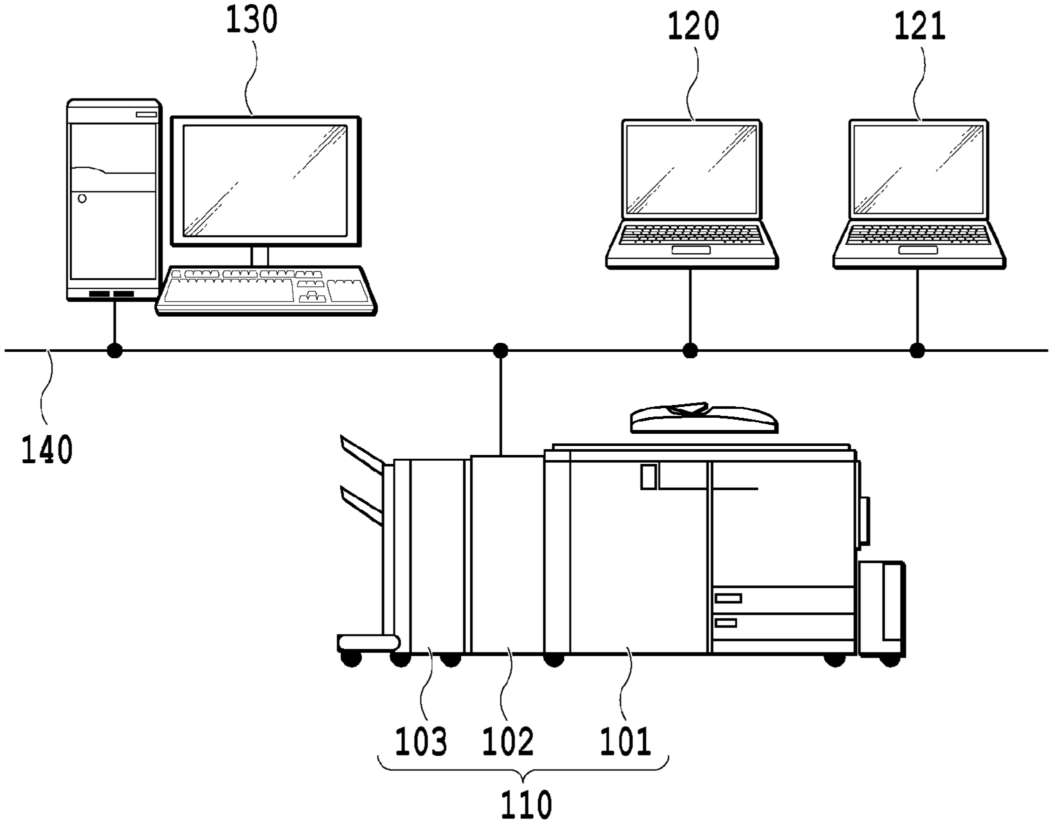
FIG. 1 is a diagram showing a configuration example of an image processing system.

FIG. 1 is a diagram showing a configuration example of an image processing system including an inspection apparatus according to the present embodiment. The image processing system according to the present embodiment has an apparatus 110, client PCs 120 and 121, a print server 130, and a network (for example, Local Area Network) 140. The apparatus 110 has an image forming apparatus 101, an inspection apparatus 102, and a finisher unit 103. The apparatus 110 employs an inline inspection method in which from image forming until finishing are performed integrally.

The image forming apparatus 101 processes various kinds of input data and outputs a printed material on which an image is formed on a printing medium, such as paper. The inspection apparatus 102 receives a printed material that is output from the image forming apparatus 101 and inspects whether or not the quality (output contents) of the image on the printing medium satisfies a predetermined criterion. The inspection apparatus 102 inspects the quality of an image, and therefore, can also be called an inspection apparatus. The finisher unit 103 receives a printing medium (output sheet) inspected in the inspection apparatus 102 and discharges the printing medium to the outside.

The apparatus 110 is connected with the print server 130 and the client PCs 120 and 121 via the network 140. The inspection apparatus 102 is connected with the image forming apparatus 101 in a one-to-one manner via a communication cable (not shown schematically). Further, the finisher unit 103 is also connected with the image forming apparatus 101 in a one-to-one manner via a communication cable (not shown schematically) separate from the above-described communication cable connecting the inspection apparatus 102 and the image forming apparatus 101. Furthermore, the inspection apparatus 102 and the finisher unit 103 are connected to each other via a communication cable separate from the above-described communication cables connecting each of the inspection apparatus 102 and the finisher unit 103 with the image forming apparatus 101.

<Configuration of Image Forming Apparatus>

Figure 2:
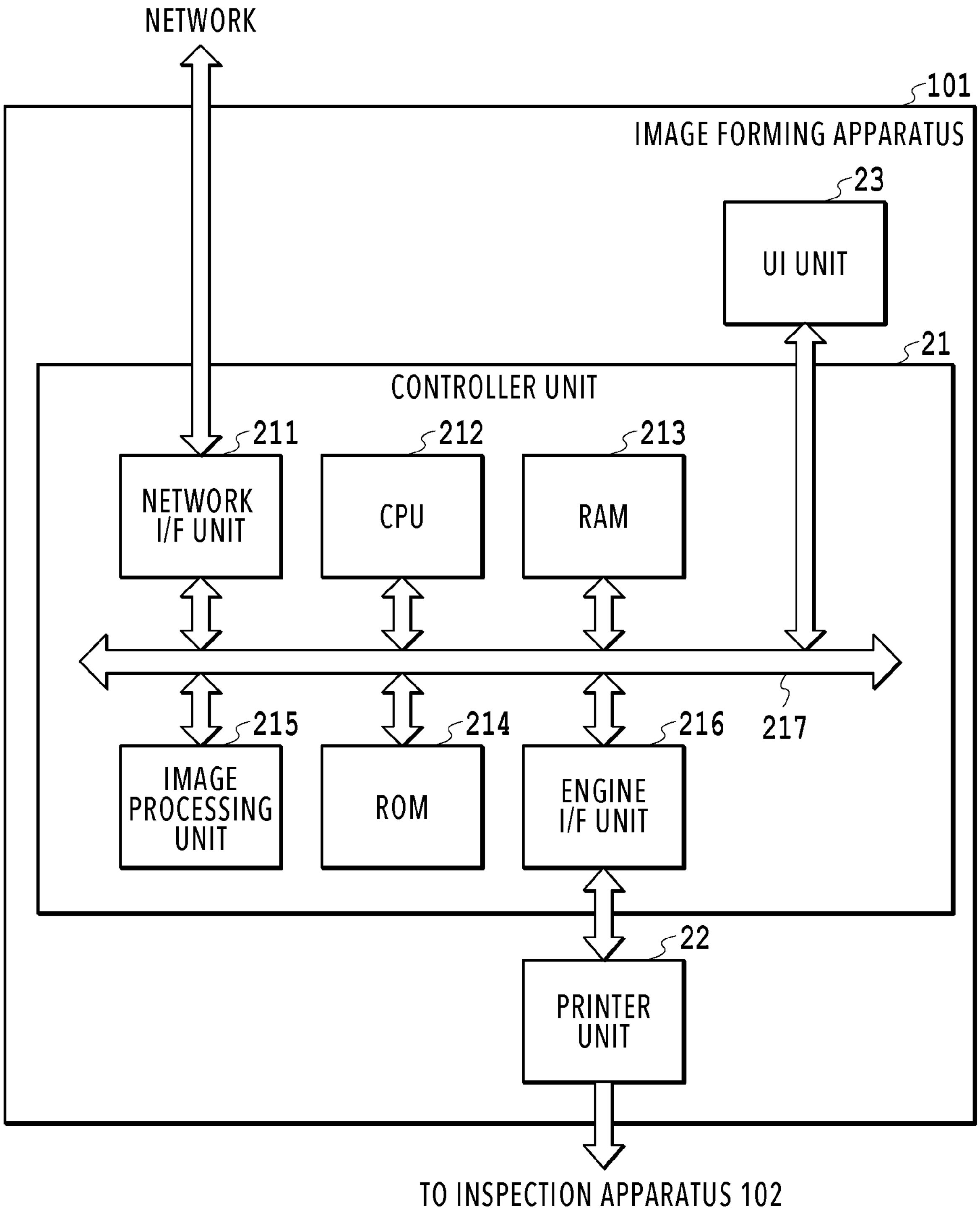
FIG. 2 is a diagram showing a configuration example of an image forming apparatus.

FIG. 2 is a diagram showing a configuration example of the image forming apparatus 101. The image forming apparatus 101 of the present embodiment has a controller unit 21, a printer unit 22, and a UI unit 23.

An image or document created by a client PC on the network, or created by a software application, such as a printer driver, not shown schematically, on the print server is transmitted as PDL data to the image forming apparatus 101 via the network. In the image forming apparatus 101, the controller unit 21 receives the transmitted PDL data.

The controller unit 21 is connected with the printer unit 22. The controller unit 21 converts the received PDL data that is transmitted from the client PC or the print server into print data that the printer unit 22 can process and outputs the converted print data to the printer unit 22.

The printer unit 22 performs printing of an image based on the converted print data output from the controller unit 21. In the present embodiment, it is assumed that the printer unit 22 is an electrophotographic printing engine. Note that the printing method is not limited to this and may be an ink jet method (IJ method) in which an image is formed by ejecting ink from a nozzle onto a printing medium.

The UI unit 23 is operated by a user and used for giving instructions to select and perform various functions. The UI unit 23 comprises a liquid crystal display on the surface of which a touch panel is provided, a keyboard on which various keys, such as a start key, a stop key, and a ten-key, are arranged, and the like. That is, the UI unit 23 has various switches, LED indicators and the like for the operation.

Next, details of the controller unit 21 are explained. The controller unit 21 has a network OF (interface) unit 211, a CPU 212, a RAM 213, a ROM 214, an image processing unit 215, an engine OF unit 216, and an internal bus 217.

The network OF unit 211 is an interface for receiving PDL data transmitted from the client PC or the print server via a network.

The CPU 212 performs processing, to be described later, which is performed by the controller unit 21, as well as performing control of the entire image forming apparatus 101 by using programs and data stored in the RAM 213 and the ROM 214. The RAM 213 comprises a work area that is used in a case where the CPU 212 performs various kinds of processing. The ROM 214 stores programs and data for causing the CPU 212 to perform various kinds of processing, to be described later, and setting data of the controller unit 21, and the like.

The image processing unit 215 performs image processing for printing for the PDL data received by the network OF unit 211 in accordance with the setting from the CPU 212 and generates print data that the printer unit 22 can process. Particularly, the image processing unit 215 generates image data in which each pixel has a plurality of color components by performing rasterization for the received PDL data. That is, the image processing unit 215 generates RIP image data (RIP data). The plurality of color components is color components independent of another in the color space, such as RGB (red, green, blue). In the image data, each pixel has an 8-bit (256 tones) value for each color component. That is, the image data is multi-value bitmap data including multi-value pixels. Further, in the above-described rasterization, attribute data indicating the attribute of the pixel of the image data for each pixel is also generated, in addition to the image data. The attribute data indicates which type of object a pixel belongs to and for example, is a value indicating the type of object, such as character or line, graphic, image, and background. The image processing unit 215 generates print data by performing color conversion from the RGB color space into the CMYK (cyan, magenta, yellow, black) color space and image processing, such as screen processing, using the generated image data and attribute data.

The engine OF unit 216 is an interface that transmits the print data generated by the image processing unit 215 to the printer unit 22. The internal bus 217 is a system bus that connects each unit of the network OF unit 211, the CPU 212, the RAM 213, the ROM 214, the image processing unit 215, the engine OF unit 216, and the UI unit 23 in such a manner that each unit is capable of transmission and reception of data.

Figure 3:
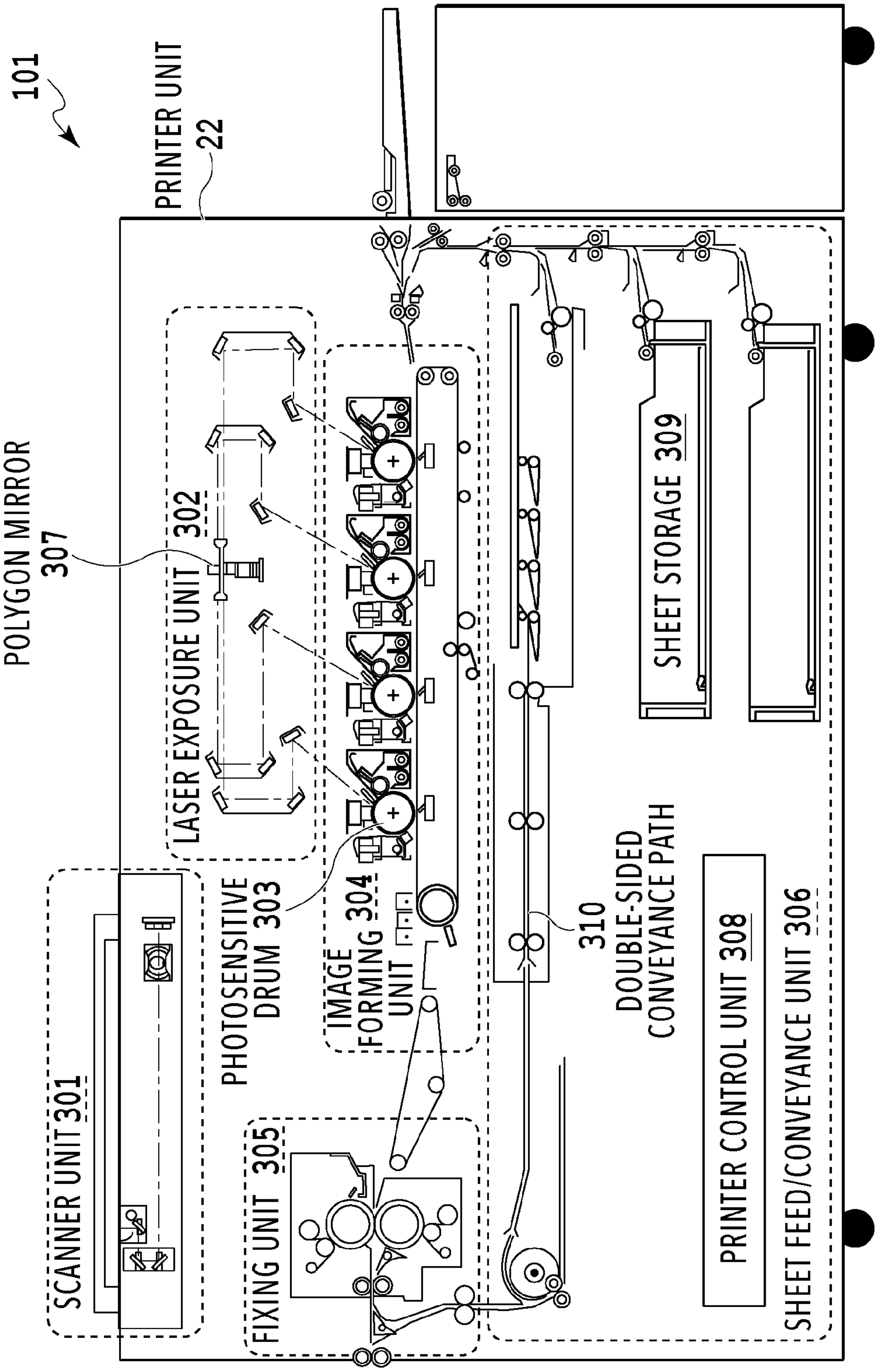
FIG. 3 is a diagram showing a mechanical configuration of a printer unit within the image forming apparatus.

FIG. 3 is a diagram showing the mechanical configuration of the printer unit 22 within the image forming apparatus 101. The printer unit 22 of the image forming apparatus 101 has a scanner unit 301, a laser exposure unit 302, a photosensitive drum 303, an image forming unit 304, a fixing unit 305, a sheet feed/conveyance unit 306, and a printer control unit 308 configured to control those units.

The scanner unit 301 creates image data (data of scanned image) of a document placed on a document table by irradiating the document with light to optically read the document image and converting the image into an electric signal. The laser exposure unit 302 causes a beam, such as a laser beam, which is modulated in accordance with the created image data to enter a polygon mirror 307 rotating at uniform angular velocity and irradiates the photosensitive drum 303 with the beam as reflected scan light.

The image forming unit 304 rotatably drives the photosensitive drum 303 and electrifies the photosensitive drum 303 by an electrifying device and develops a latent image formed on the photosensitive drum 303 by the laser exposure unit 302 with toner. The image forming unit 304 transfers the toner image onto a sheet, and collects a small amount of toner that is not transferred at the time of transfer and remains on the photosensitive drum 303. The image forming unit 304 is implemented by using four developing units (developing stations) performing the series of electrophotographic processes described above. The four developing units arranged side by side in order of cyan (C), magenta (M), yellow (Y), and black (K) sequentially perform the operation to form a magenta image, a yellow image, and a black image after a predetermined time elapses after starting to form an image in the cyan station. Due to this timing control, a full-color toner image without color discrepancy is transferred onto the sheet. In the present embodiment, a color printer is supposed, but the present embodiment is not limited to this. In a case of a black and white printer, only the black developing unit is mounted.

The fixing unit 305 includes a combination of rollers and belts and incorporates a heat source, such as a halogen heater, and dissolves and fixes the toner on the sheet onto which the toner image is transferred by the image forming unit 304 by applying heat and pressure. In a case where printing is performed on a thick sheet, the sheet is thick and the thermal conductivity of the sheet is poor, and therefore, it is necessary to reduce the speed at which the sheet is caused to pass through the fixing unit 305 to, for example, half the normal speed. Resulting from this, the sheet conveyance speed in each unit other than the fixing unit 305 is halved in a case where a thick sheet is printed, and therefore, the printing speed itself of the image forming apparatus 101 is halved.

The sheet feed/conveyance unit 306 has one or more sheet storages 309 represented by a sheet cassette or a paper deck and separates one sheet from a plurality of sheets stored in the sheet storage 309 in accordance with instructions of the printer control unit 308 and conveys the sheet to the image forming unit 304 and the fixing unit 305. The sheet is conveyed and the toner image of each color is transferred onto the sheet by the developing station described previously and finally, a full-color toner image is formed on the sheet. Further, in a case where an image is formed on both sides of a sheet, control is performed so that the sheet having passed through the fixing unit 305 passes through a double-sided conveyance path 310 that conveys the sheet again to the image forming unit 304.

The printer control unit 308 communicates with the controller unit 21 configured to control the entire image forming apparatus 101 and controls the printer unit 22 in accordance with instructions thereof. Further, the printer control unit 308 manages the state of each unit of the scanner unit 301, the laser exposure unit 302, the image forming unit 304, the fixing unit 305, and the sheet feed/conveyance unit 306 described previously and gives instructions so that all the units are capable of smoothly operating in harmony with one another.

<Configuration of Inspection Apparatus>

Figure 4A:
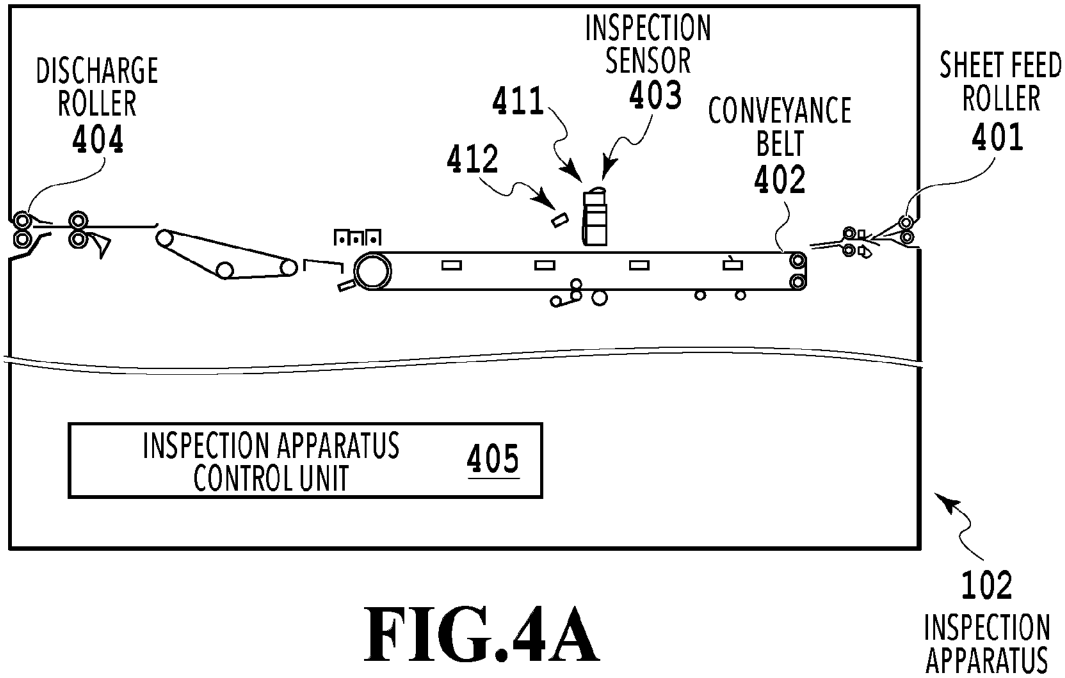
FIG. 4A and FIG. 4B are each a diagram showing a mechanical configuration of an inspection apparatus.
Figure 4B:
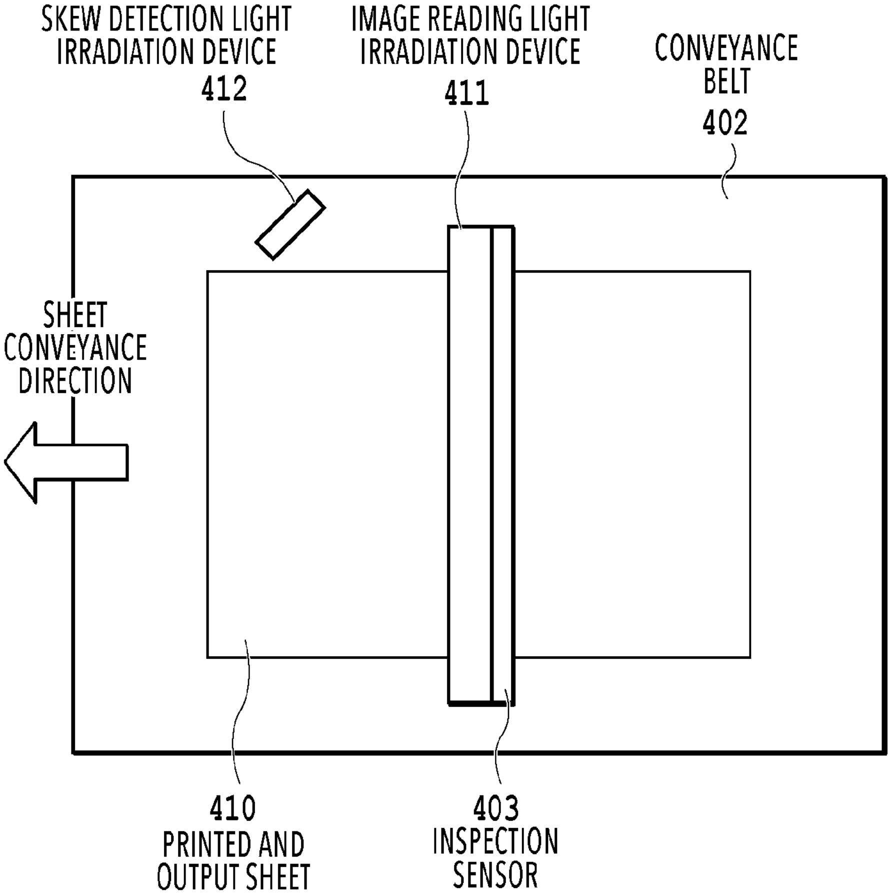

FIG. 4A and FIG. 4B are each a diagram showing the mechanical configuration of the inspection apparatus and FIG. 4A shows an outline of the internal configuration of the inspection apparatus 102 and FIG. 4B shows the top surface in a case where the portion of a conveyance belt 402 is viewed from above. A sheet (printed material) 410 printed and output from the image forming apparatus 101 is pulled into the inspection apparatus 102 by a sheet feed roller 401. After that, the sheet that is printed and output (also called printed and output sheet) 410 is conveyed on the conveyance belt 402 and the image on the sheet is read by an inspection sensor 403 provided above the conveyance belt 402. Based on the image data of the image read by the inspection sensor 403, whether the image on the sheet is of good quality or not is determined. By using the image (scanned image) read by the inspection sensor 403, inspection processing is performed in an inspection apparatus control unit 405. Further, the inspection apparatus control unit 405 also performs control of the entire inspection apparatus 102. The inspection results are sent to the finisher unit 103. After the inspection is performed, the printed material 410 is output from the inspection apparatus 102 by a discharge roller 404. Although not shown schematically in FIG. 4A and FIG. 4B, the structure may be one in which the inspection sensor 403 is installed under the conveyance belt 402 so as to be capable of dealing with a double-sided printed material and the backside of the printed material is read by the inspection sensor installed under the conveyance belt 402.

The inspection sensor 403 is a line sensor that reads the image of the entire surface of the conveyed printed material 410 for each line.

An image reading light irradiation device 411 irradiates the sheet (printed material) 410 with light in a case where the image on the sheet is read by the inspection sensor 403. A skew detection light irradiation device 412 detects whether the printed material 410 is skewed with respect to the conveyance direction in a case where the sheet (printed material) 410 is conveyed on the conveyance belt 402. By irradiating the printed material 410 that is conveyed with light from an oblique direction, the image of the shadow at the end portion of the sheet is read and skew is detected. In the present embodiment, the configuration is such that the reading of the shadow image at the end portion of the sheet is performed by the inspection sensor 403, but the configuration may be one in which another reading sensor other than the inspection sensor 403 is used.

<Configuration of Inspection Apparatus Control Unit>

Figure 5A:
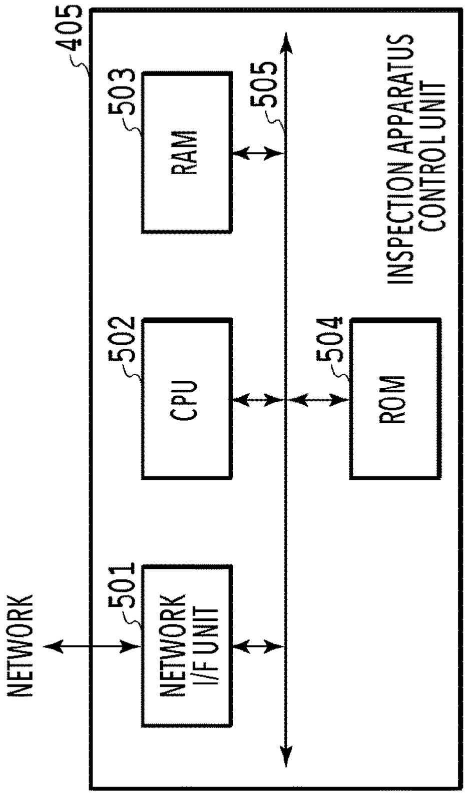
FIG. 5A and FIG. 5B are each a diagram showing a configuration of an inspection apparatus control unit.
Figure 5B:
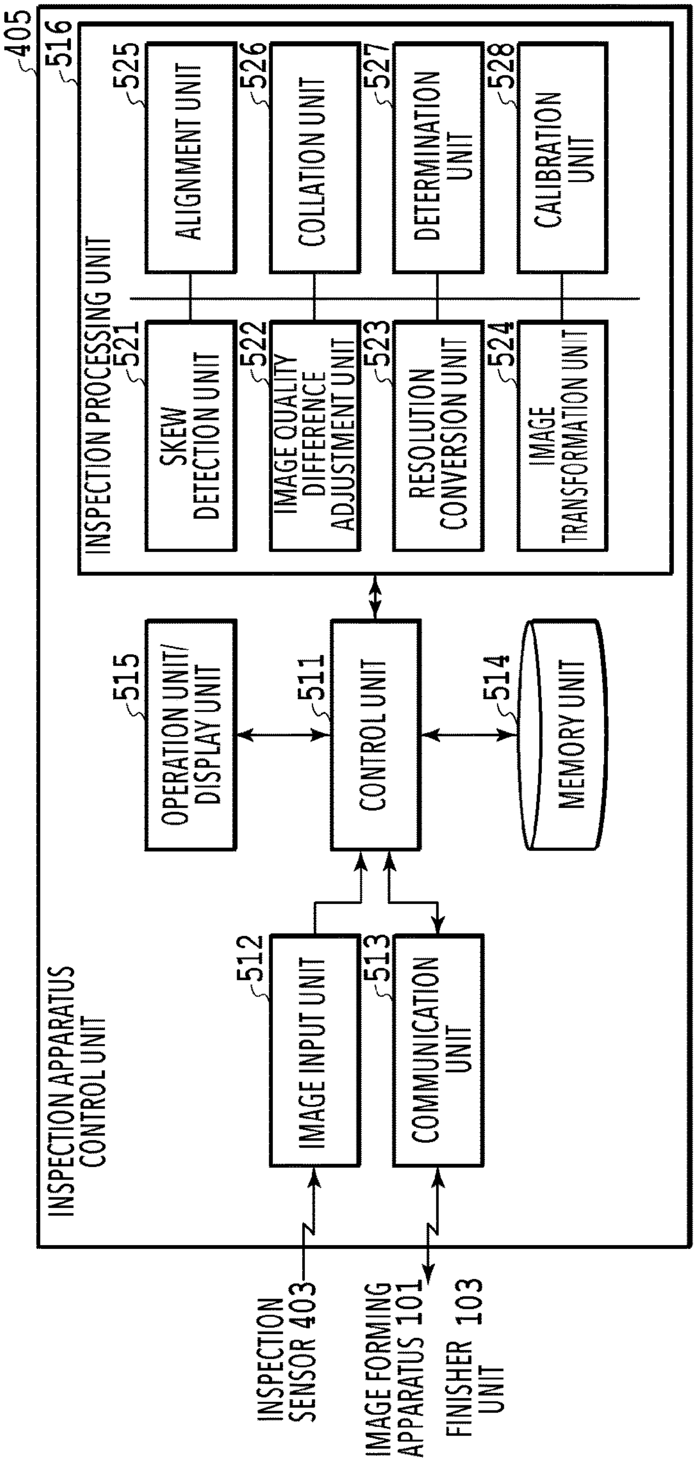

FIG. 5A and FIG. 5B are each a diagram showing the configuration of the inspection apparatus control unit and FIG. 5A shows a hardware configuration example of the inspection apparatus control unit and FIG. 5B shows the function configuration of the inspection apparatus control unit. As shown in FIG. 5A, the inspection apparatus control unit 405 has a network OF unit 501, a CPU 502, a RAM 503, a ROM 504, and a bus 505. The network OF unit 501 is an interface for receiving image data transmitted from the image forming apparatus 101 and the like via a network.

The CPU 502 performs control of the entire inspection apparatus 102 by using programs and data stored in the RAM 503 and the ROM 504. The RAM 503 comprises a work area that is used in a case where the CPU 502 performs various kinds of processing. The ROM 504 stores programs, data and the like for causing the CPU 502 to perform various kinds of processing, to be described later.

<Function Configuration of Inspection Apparatus Control Unit>

As shown in FIG. 5B, the inspection apparatus control unit 405 has a control unit 511, an image input unit 512, a communication unit 513, a memory unit 514, an operation unit/display unit 515, and an inspection processing unit 516. The control unit 511 controls each function unit within the inspection apparatus control unit 405.

The image input unit 512 receives the input of a scanned image obtained by the inspection sensor 403 reading a printed material. The scanned image whose input to the inspection apparatus control unit 405 is received is stored in the memory unit 514.

The communication unit 513 performs communication with the controller unit 21 of the image forming apparatus 101. The communication with the image forming apparatus 101 includes reception of image data (reference image) corresponding to the scanned image and utilized for printing, and transmission and reception of inspection control information. That is, the communication includes reception of the reference image that is taken as a reference in inspection. The received reference image and inspection control information are stored in the memory unit 514. One piece of the inspection control information that is transmitted to and received from the image forming apparatus 101 is synchronization information for establishing a correspondence relationship between the scanned image and the reference image, such as print job information, number of copies information, and page order information. Another pieces of the inspection control information that is transmitted to and received from the image forming apparatus 101 is inspection results information and control information for controlling the operation of the image forming apparatus 101 in accordance with the inspection results information. The synchronization information is necessary because there is a case where the order of the inspection apparatus 102 receiving the scanned image and the reference image utilized for printing the scanned image is different due to double-sided printing and printing of a plurality of copies. Further, the synchronization information is necessary because there is a case where one reference image corresponds to a plurality of scanned images.

Further, the communication unit 513 performs communication with the finisher unit 103. The communication with the finisher unit 103 includes transmission of inspection control information. The inspection control information that is transmitted to the finisher unit 103 is inspection results information and control information for controlling the operation of the finisher unit 103 relating thereto.

The inspection processing unit 516 is a processing unit whose operation is controlled by the control unit 511. The inspection processing unit 516 performs inspection determination processing sequentially for the pair of the scanned image and the reference image corresponding to each other based on the synchronization information, which is one piece of the inspection control information that is transmitted to and received from the above-described image forming apparatus 101, by utilizing the function unit within the inspection processing unit 516. Details of the function unit within the inspection processing unit 516 will be described later. After the inspection determination processing is completed, the determination results are displayed on the operation unit/display unit 515. In a case where the determination results indicative of image anomaly are obtained, the control unit 511 switches the control of the image forming apparatus 101 and the finisher unit 103 to another through the communication unit 513 in accordance with the setting designated in advance by a user in the operation unit/display unit 515. For example, the control unit 511 stops the image forming apparatus 101 and switches a discharge tray of the finisher unit 103 to an escape tray.

<Internal Configuration of Inspection Processing Unit>

The internal configuration of the inspection processing unit 516 is explained. The inspection processing unit 516 has a skew detection unit 521, an image quality difference adjustment unit 522, a resolution conversion unit 523, an image transformation unit 524, an alignment unit 525, a collation unit 526, a determination unit 527, and a calibration unit 528.

The skew detection unit 521 is a module that detects a skew angle of a scanned image. The scanned image is an image scanned in the state where a shadow is produced at the end portion of a sheet. The reason is that the inspection sensor 403 scans the sheet pulled into the inspection apparatus 102 and conveyed on the conveyance belt 402 in the state where the sheet is irradiated with light by the skew detection light irradiation device 412 and the shadow is produced at the end portion of the sheet. By using this shadow, the skew angle of the sheet is detected. The detected skew angle is utilized for correction processing by the image transformation unit 524, to be described later.

The image quality difference adjustment unit 522 is a module that adjusts the image quality difference between the scanned image and the reference image. The scanned image is an image obtained by scanning a printed material printed by utilizing the corresponding reference image. Even though the scanned image has no image anomaly, there exists a difference in the image from the reference image. The difference is generated by the influence of the image processing before printing, the influence of the characteristics of the image forming apparatus, the influence of the scanner characteristics, and the like. The image processing before printing is color conversion processing, gamma processing, halftone processing and the like. The characteristics of the image forming apparatus are the color reproducibility, the dot gain, the gamma characteristic and the like. The scanner characteristics are the color reproducibility, S/N, scanner MTF and the like. Further, there is a case where the number of bits is different between the images. In a case where those influences are removed and there is no image anomaly, various kinds of processing are performed for both the scanned image and the reference image or only for the reference image so that the difference between the scanned image and the reference image is eliminated. The various kinds of processing are, for example, color conversion processing, gamma correction processing, filter processing (for adjusting descreening and image edge rounding), bit width adjustment and the like.

Performing various kinds of processing only for the reference image is equivalent to simulating the characteristics of the image forming apparatus 101 in which no image anomaly occurs and the inspection sensor 403 because an image equivalent to the scanned image is created from the reference image by simulation.

The resolution conversion unit 523 is a module that performs conversion of the resolution of the scanned image and the reference image. There is a case where the resolution is different between the scanned image and the reference image at the point in time at which they are input to the inspection apparatus control unit 405. Further, there is a case where the resolution that is utilized in each module of the inspection processing unit 516 is different from the input resolution. In the case such as that, resolution conversion is performed in this module. For example, it is assumed that the resolution of the main scan of the scanned image is 600 dpi and that of the sub scan is 300 dpi, and the resolution of the main scan of the reference image is 1,200 dpi and that of the sub scan is 1,200 dpi. In a case where the resolution of both the main scan and the sub scan that is required by the inspection processing unit 516 is 300 dpi, the scaling of each image is reduced so that the resolution of both the main scan and the sub scan of both the images is 300 dpi. As a scaling method, it is possible to utilize a publicly known method by taking into consideration the calculation load and the required accuracy. For example, in a case where scaling utilizing the SINC function is performed, the calculation load is heavy, but it is possible to obtain highly accurate scaling results. In a case where scaling utilizing the nearest neighbor method is performed, the calculation load is light, but the accuracy of scaling results to be obtained is low.

The image transformation unit 524 is a module that performs image transformation of the scanned image and the reference image. There exists a geometrical difference between the scanned image and the reference image due to expansion/contraction and skew of the sheet during printing and the skew during a scan. The image transformation unit 524 corrects the geometrical difference by performing image transformation based on information obtained by the skew detection unit 521 and the alignment unit 525, to be described later. Examples of the geometrical difference are liner transformation (rotation, expansion/reduction, or shearing) and translation. This geometrical difference can be represented as affine transformation and it is made possible to perform correction by obtaining affine transformation parameters from the skew detection unit 521 and the alignment unit 525. The information that is obtained from the skew detection unit 521 is only parameters (skew angle information) relating to rotation.

<Alignment Unit 525>

The alignment unit 525 is a module that performs alignment between the scanned image and the reference image. Note that it is premised that the resolution of the scanned image and the resolution of the reference image are the same, which are input to the alignment unit 525. The higher the resolution of the image that is input, the higher the accuracy of alignment becomes, but the heavier the calculation load becomes. By performing correction in the image transformation unit 524 based on the parameters obtained by alignment, it is made possible to obtain the scanned image and the reference image, which are utilized in the collation unit 526, to be described later. As the alignment method, a variety of methods are considered, and in the present embodiment, in order to reduce the calculation load, a method is utilized in which alignment of the entire image is performed by utilizing information on part of the area of the image in place of the entire image. The alignment of the present embodiment includes three steps of selection of a patch for alignment, alignment of each patch, and estimation of affine transformation parameters. Each step is explained.

First, the first step, that is, selection of a patch for alignment is explained. Here, it is assumed that "patch" refers to a rectangular area within the image. In the selection of a patch for alignment, a plurality of patches suitable for alignment is selected from the reference image. As a patch suitable for alignment, a patch whose corner feature amount within the patch is large is considered. The corner feature is a feature (intersection of two image edges) such that two conspicuous image edges whose directions are different exist in the vicinity of a certain local portion. The corner feature amount is a feature amount representing the strength of the image edge feature. Based on the difference in modeling "image edge feature", a variety of methods have been devised. As one of methods of calculating a corner feature amount, there is a publicly known method called Harris corner detection method. In the Harris corner detection method, a corner feature amount image is calculated from a differential image in the horizontal direction (image edge feature amount image in the horizontal direction) and a differential image in the vertical direction (image edge feature amount image in the vertical direction). This corner feature amount image is an image representing the image edge amount of the image edge that is weaker of the two image edges configuring the corner feature. The corner feature represents the magnitude of a corner feature amount depending on whether a relatively weaker image edge has a strong image edge amount because both the two image edges should be strong image edges. From the reference image, the corner feature amount image is calculated and the portion having a large corner feature amount is selected as a patch suitable for alignment. Simply selecting an area in order from the area having the largest corner feature amount as a patch may result is a case where patches are selected only from a locally limited area. In the case such as that, the number of areas in which no patch exists increases on the periphery and it is no longer possible to utilize image transformation information on such an area, and therefore, this is not the state suitable to perform alignment of the entire image. Consequently, in a case where a patch is selected, distribution of a patch within the image is also taken into consideration in place of simply taking into consideration the magnitude of the corner feature amount. Specifically, even though the corner feature amount value in a certain patch candidate area is not a large value among the values within the entire image, in a case where the value within a local area of the image is large, the portion is selected as a patch. By doing so, it is made possible to distribute and arrange patches within the reference image. The parameters in the patch selection include the patch size and the number of patches (or patch density). In a case where the patch size increases and the number of patches increases, the alignment accuracy improves, but the calculation load becomes heavy.

Next, the second step, that is, alignment of each patch is explained. In the alignment of each patch, alignment is performed between a patch for alignment within the reference image, which is selected in the previous stage, and a corresponding patch within the scanned image.

There are two kinds of information obtained as results of alignment. The first information is center coordinates (refpX_i, refpY_i) of the patch for alignment within the ith (i=1 to N, N is the number of patches) reference image. The second information is the position (scanpX_i, scanpY_i) of the center coordinates within the scanned image. The alignment method may be any method as long as it is a method of estimating a shift amount by which a relationship between (refpX_i, refpY_i) and (scanpX_i, scanpY_i) is obtained. For example, a method of estimating a shift amount or the like is considered, in which the patch for alignment and the corresponding patch are brought onto a frequency space by using Fast Fourier Transformation (FFT) and the correlation is obtained on the frequency space.

Lastly, the third step, that is, estimation of affine transformation parameters is explained. The affine transformation is a coordinate transformation method expressed by formula (1) below.

$$\begin{pmatrix} x' \\ y' \end{pmatrix} = \begin{pmatrix} a & b \\ c & d \end{pmatrix}\begin{pmatrix} x \\ y \end{pmatrix} + \begin{pmatrix} e \\ f \end{pmatrix} \quad (1)$$

In formula (1) described above, as the affine transformation parameters, six kinds of parameter exist: a, b, c, d, e, and f. Here, (x, y) corresponds to (refpX_i, refpY_i) and (x', y') corresponds to (scanpX_i, scanpY_i). By using this correspondence relationship that is obtained from N patches, the affine transformation parameters are estimated. For example, it is possible to find affine transformation parameters by using the least squares method. By creating an image for which alignment correction has been performed by transforming the reference image or the scanned image in the image transformation unit 524 based on the found affine transformation parameters, it is made possible to utilize the image as the set of the reference image and the scanned image in the collation unit 526.

The collation unit 526 collates the scanned image and the reference image corresponding to the scanned image and which is taken as a reference in inspection. The determination unit 527 determines the presence/absence of a blot on a printed material by using the collation results by the collation unit 526 and a threshold value for detecting a blot on a printed material. The determination unit 527 obtains the determination results indicating the presence of a blot on a printed material and the determination results indicating the absence of a blot on a printed material, and therefore, it can be said that the determination unit 527 detects a blot on a printed material.

<Calibration Unit 528>

The calibration unit 528 is a module that determines correction parameters used in correction processing in the image quality difference adjustment unit 522 in order to match the image edge reproducibility and the noise reproducibility between the RIP image (reference image) and the scanned image (inspection image). The calibration unit 528 determines correction parameters based on the reference image used for printing of a calibration chart, to be described later, and the scanned image generated by reading the calibration chart received by the image input unit 512. Details of the calibration processing will be described later.

<Generation Processing of Reference Image>

Figure 6:
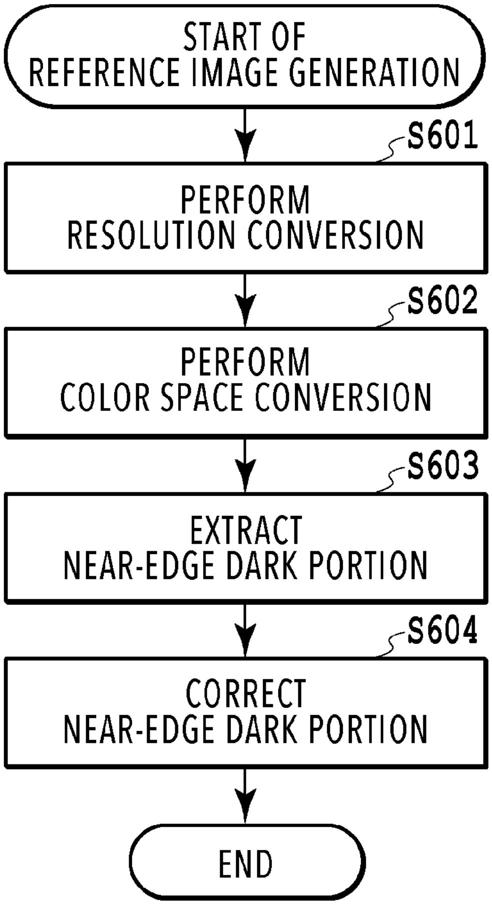
FIG. 6 is a flowchart showing a flow of generation processing of a reference image.

The flow of generation processing of a reference image that is performed by the image quality difference adjustment unit 522 according to the present embodiment is explained by using the drawing. FIG. 6 is a flowchart showing the flow of the generation processing of a reference image. The generation processing of a reference image is performed in the preprocessing of inspection processing, to be described later. The processing to be explained below is implemented by, for example, the CPU 502 reading a program stored in the ROM 504 onto the RAM 503 and executing the program.

By using a color conversion table generated and stored in advance, color conversion processing is performed. The color conversion table is stored in the RAM 503 or the ROM 504. As an example, it is assumed that the RIP image has a resolution of 600 dpi and in which each pixel is represented by eight bits in the CMYK color space and the scanned image has a resolution of 150 dpi and in which each pixel is represented by eight bits in the RGB color space. A symbol "S" in explanation of a flowchart represents a step. This also applies to explanation of the following flowcharts.

At S601, the image quality difference adjustment unit 522 converts the resolution of the RIP image (reference image) into 150 dpi, which is the same resolution as that of the scanned image.

At S602, the image quality difference adjustment unit 522 coverts the color space of the RIP image from the CMYK color space into the RGB color space by using the color conversion table stored in advance.

At S603, the image quality difference adjustment unit 522 performs analysis processing for a near-image-edge dark portion area (dark portion area in edge portion of image) within the RIP image and specifies an area in which overdetection is likely to occur. In the present embodiment, a method is used, which specifies a near-image-edge dark portion area (dark portion area in edge portion of image) by performing image edge extraction (extraction of edge portion of image) and dark portion extraction (extraction of dark portion area), respectively, and calculating the logical product of them as an area image.

<Extraction Method of Near-Image-Edge Dark Portion Area>

Figure 7A:
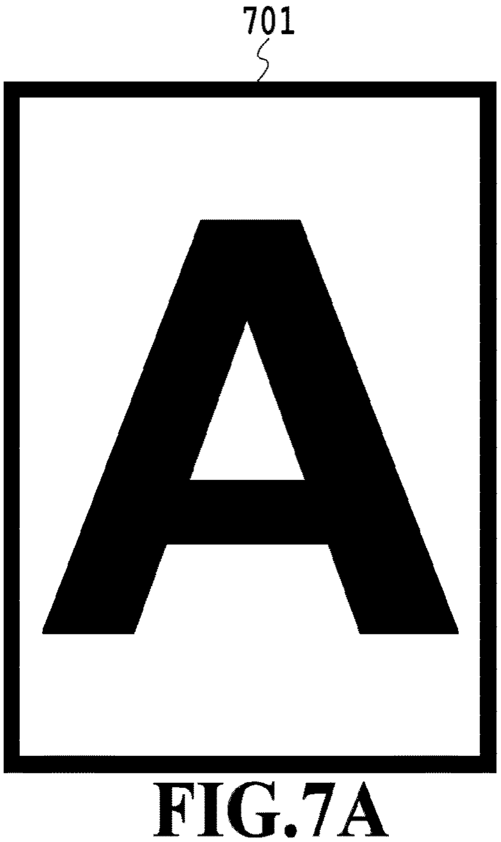
FIG. 7A to FIG. 7D are each a diagram explaining an extraction method of a near-image-edge dark portion area.
Figure 7B:
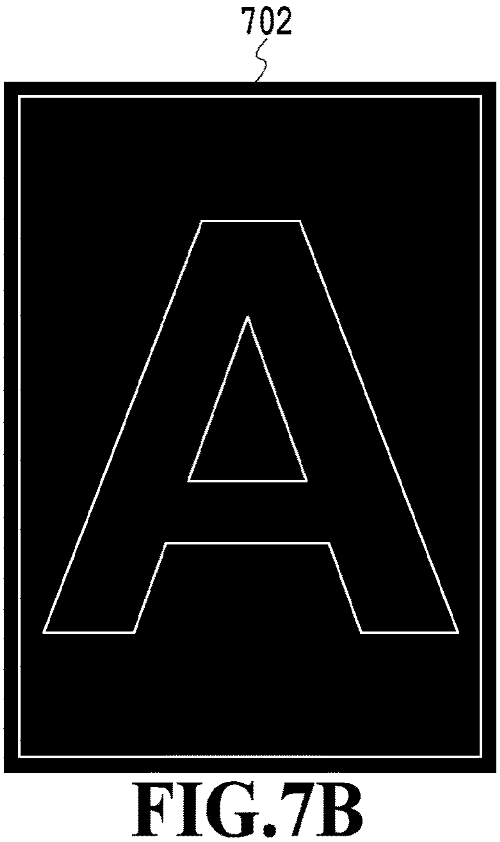
Figure 7C:
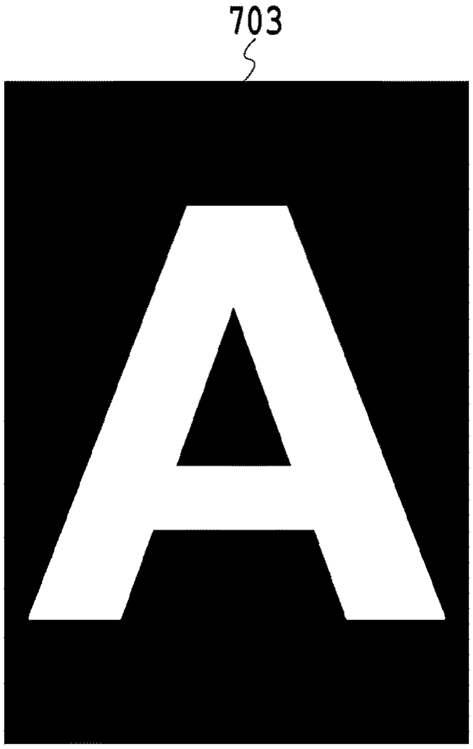
Figure 7D:
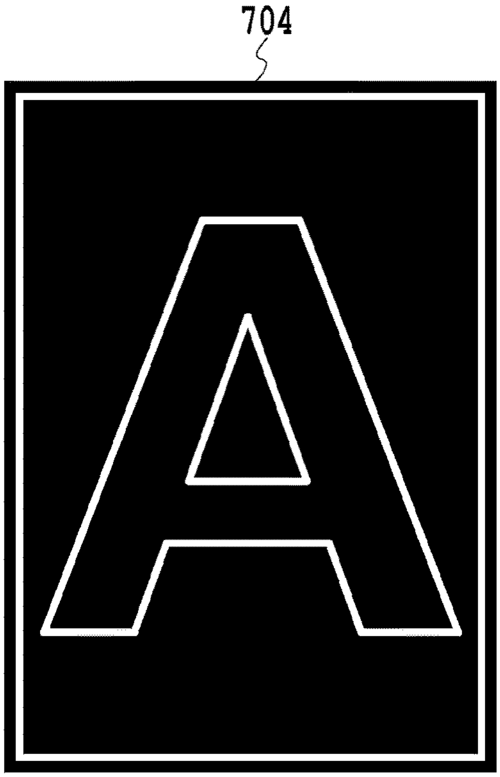

FIG. 7A to FIG. 7D are each a diagram explaining an extraction method of a near-image-edge dark portion area (predetermined area including edge) from a reference image. FIG. 7A shows a RIP image 701, which is a reference image example. FIG. 7B shows an image 702 after performing processing to extract an image edge for the RIP image 701. FIG. 7C shows an image 703 after performing processing to extract a dark portion for the RIP image 701. FIG. 7D shows a logical product image 704 of the image 702 for which image edge extraction has been performed and the image 703 for which dark portion extraction has been performed.

As shown in FIG. 7A, the RIP image 701 is an image whose background is a white solid color and a character "A" is represented in black at the center.

Figure 8A:
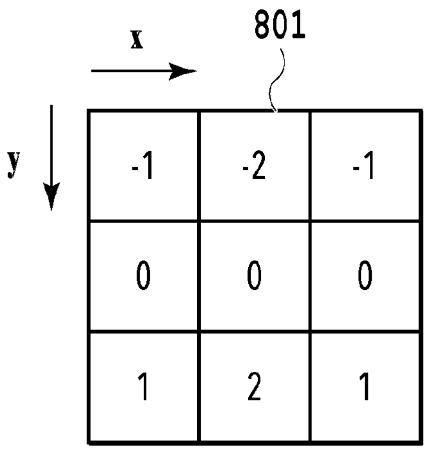
FIG. 8A and FIG. 8B are each a diagram showing a filer kernel example for extracting an image edge.
Figure 8B:
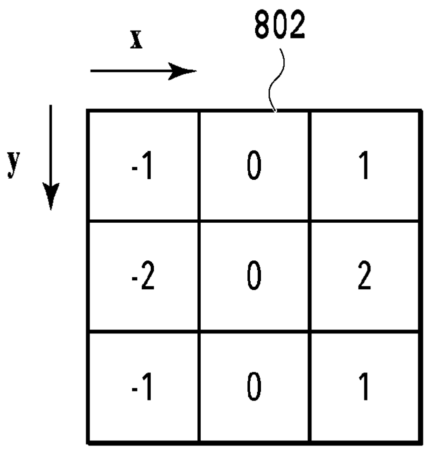

In the image 702 for which image edge extraction has been performed, as shown in FIG. 7B, the white portion is extracted as an image edge. As a method of extracting an image edge, for example, it is possible to utilize a publicly known method, such as a Sobel filter. The Sobel filter is explained by using the drawings. FIG. 8A and FIG. 8B are each a diagram showing a filer kernel example of the Sobel filter. FIG. 8A shows a filter kernel 801 of the Sobel filter that performs image edge extraction in the vertical direction. FIG. 8B shows a filter kernel 802 of the Sobel filter that performs image edge extraction in the transverse direction. It is possible to extract the image edge of the RIP image by applying these filter kernels 801 and 802, respectively, after converting the RIP image into a luminance image whose luminance value is from 0 to 255, and calculating the logical sum of the absolute values and then performing binarization processing. In the binarization processing in a case where an image edge is extracted, for example, binarization is performed by taking the binarization threshold value to be 200. By performing binarization processing under this condition, the area whose calculation results of the logical sum are 200 or larger is extracted as an image edge.

In the image 703 for which dark portion extraction has been performed, as shown in FIG. 7C, the white portion is extracted as the dark portion. As the method of extracting a dark portion, for example, there is a method in which an RGB image is converted into a luminance image and binarization processing is performed for the luminance value with a threshold value. As the threshold value that is used in this binarization processing, a fixed value found empirically may be used or a value calculated by using a scanned image in calibration processing, to be described later, may be used. In the binarization processing in a case where a dark portion is extracted, for example, binarization is performed for a luminance image whose luminance value is from 0 to 255 by taking the binarization threshold value to be 100. By performing binarization processing under this condition, the area whose luminance value is 100 or less is extracted as a dark portion.

In the logical product image 704 of the image 702 for which image edge extraction has been performed and the image 703 for which dark portion extraction has been performed, as shown in FIG. 7D, the white portion is extracted as the area corresponding to the dark portion area in the image edge portion of the RIP image 701. First, expansion processing is performed for each of the image 702 for which image edge extraction has been performed and the image 703 for which dark portion extraction has been performed. By this expansion processing, the distance from the image edge in the near-image-edge dark portion area is adjusted. As the distance, a fixed value found empirically by taking into consideration the size of the filter kernel of smoothing processing, to be described later, may be used, or a value calculated by using a scanned image in calibration processing, to be described later, may be used. For example, in a case where the area whose distance from the image edge is 10 mm is taken to be the near-image-edge dark portion area, in the processing of the present embodiment in which the required resolution is 150 dpi, the image is expanded by an amount corresponding to 59 pixels. Lastly, the logical produce of the image obtained by performing expansion processing for the image for which image edge extraction has been performed and the image for which dark portion extraction has been performed is calculated. By the above processing, it is possible to specify the near-image-edge dark portion area.

At S604, the image quality difference adjustment unit 522 performs correction processing for suppressing overdetection for the near-image-edge dark portion area in the RIP image. In the present embodiment, a method is employed in which correction processing is performed by using the area image calculated at S603 as an image mask.

Figure 9:
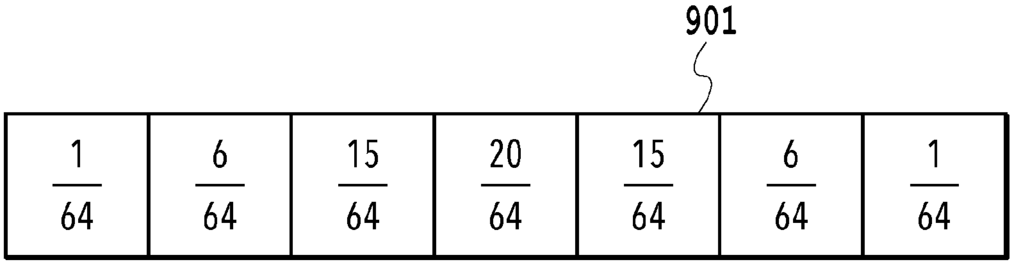
FIG. 9 is a diagram showing a filer kernel example of a smoothing filer.

First, smoothing processing is performed for the image mask area on the RIP image. It is possible to perform smoothing processing by applying a smoothing filter and a publicly known method, such as the Gaussian filter, can be utilized. The Gaussian filter is explained by using the drawing. FIG. 9 is a diagram showing a filter kernel example of the smoothing filer. It is possible to perform smoothing processing by applying a filter 901 in the vertical direction and in the transverse direction. As the filter coefficient, a fixed value found empirically may be used, or a value calculated by using a scanned image in calibration processing, to be described later, may be used. For example, it may also be possible to change the filter coefficient in accordance with the magnitude of a defect desired to be detected. Due to this, it is possible to perform smoothing processing only for the near-image-edge dark portion area in the RIP image.

Following the above, noise appending processing is performed for the image mask area on the RIP image. It is possible to append noise by generating a random number in accordance with a noise amplitude amount for each pixel in the image mask area on the RIP image and performing addition and subtraction of the generated random number for the pixel value.

For example, in a case where the pixel value of the RIP image is higher than the pixel value of the reference image, addition is performed. In a case where the pixel value of the RIP image is lower than the pixel value of the reference image, subtraction is performed. As the noise amplitude amount, a fixed value found empirically may be used, or a value calculated by using a scanned image in calibration processing, to be described later, may be used. In a case where an RGB image is obtained by a contact image sensor (CIS) or a charge-coupled device (CCD) image sensor, the sensitivity of a dark portion is low and there is an increase in the RGB values of the dark portion by gamma correction, and therefore, noise is emphasized. For example, in a case where an amount of noise of 0 to 5 is estimated by an increase in the RGB values of the dark portion at the time of gamma correction in an image in which each of the RGB values takes 0 to 255, the noise amplitude amount is taken to be 5 and a random number of 0 to 5 is added to the RGB values of each pixel. Further, it may also be possible to change the noise amplitude amount in accordance with the size of the defect desired to be detected. Due to this, it is possible to append noise only to the near-image-edge dark portion area in the RIP image.

In order to eliminate the difference between the RIP image and the scanned image, it may also be possible to perform smoothing processing and noise appending processing for the entire RIP image and further, in order to suppress overdetection, it may also be possible to perform additional smoothing processing and noise appending processing only for the dark portion area near the image edge. In the case such as that, for example, there is a method of performing smoothing processing with a first filter coefficient for the entire RIP image and further performing smoothing processing with a second filter coefficient only for the near-image-edge dark portion area. Further, there is a method of performing smoothing processing with the first filter coefficient for the area other than the dark portion area near the edge image and performing smoothing processing with the second filter coefficient for the dark portion area near the image edge. This is also the same for noise appending processing. Further, in the present embodiment, the aspect is explained in which noise appending processing is performed after performing smoothing processing for the RIP image, but the aspect is not limited to this. The aspect may one in which smoothing processing is performed after performing noise appending processing, or the aspect may be one in which only one of noise appending processing and smoothing processing is performed.

<Control Flow of Inspection Apparatus>

Figure 10:
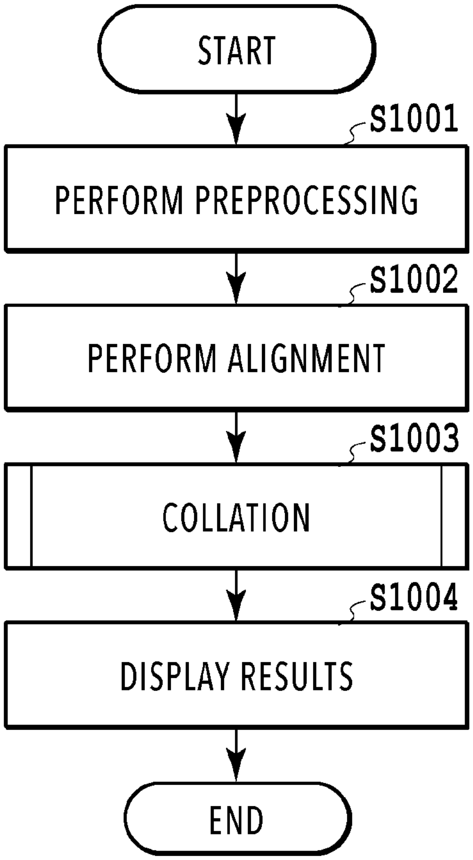
FIG. 10 is a flowchart showing a flow of inspection processing.

A flow of inspection processing is explained by using the drawing. FIG. 10 is a flowchart showing a flow of inspection processing. It is assumed that the inspection processing is performed after the calibration processing described previously is performed. The entire flow is stored in the memory unit 514 and performed comprehensively by the control unit 511. Further, the results of the processing by each processing unit are stored in the memory unit 514 and utilized in subsequent processing.

At S1001, the control unit 511 performs preprocessing of the inspection processing. Specifically, the control unit 511 selects an image pair of a scanned image and a reference image, which are processing targets, by using inspection control information stored in the memory unit 514 and received from the image forming apparatus 101 via the communication unit 513. Following the above, the control unit 511 obtains inclination information on the scanned image by processing the scanned image in the skew detection unit 521. Then, based on the inclination information, the control unit 511 performs correction processing of the scanned image in the image transformation unit 524. In parallel to this, the control unit 511 performs generation processing of the reference image described previously and processes the reference image in the image quality difference adjustment unit 522 to turn the reference image into an image suitable for inspection processing. That is, the control unit 511 turns the reference image into an image obtained by performing smoothing processing and noise appending processing for the near-image-edge dark portion area of the reference image.

At S1002, the control unit 511 performs alignment by using the scanned image and the reference image, both obtained at S1001. Specifically, first, the control unit 511 converts the resolutions of the scanned image and the reference image into a predetermined resolution (for example, 300 dpi×300 dpi) in the resolution conversion unit 523. Then, the control unit 511 processes the scanned image and the reference image whose resolutions have been converted into a predetermined resolution in the alignment unit 525 and obtains affine transformation parameters. Lastly, the control unit 511 performs correction processing of the reference image in the image transformation unit 524 by using the affine transformation parameters obtained from the alignment unit 525 and changes the coordinate system to the same coordinates system of the scanned image and turns the images into images that can be utilized for collation.

At S1003, the control unit 511 performs collation/determination processing by using the scanned image and the reference image, both obtained at S1002. Specifically, first, the control unit 511 performs collation processing of the scanned image and the reference image in the collation unit 526. By the collation processing, collation results of collating the scanned image and the reference image are obtained. Then, the control unit 511 performs determination processing in the determination unit 527 by using the collation results by the collation unit 526 and a threshold value for detecting a blot on a printed material. As the threshold value, there is a threshold value for detecting a streak on a printed material, or a threshold value for detecting a spot-shaped defect on a printed material. The determination processing by the determination unit 527 is performed by the control unit 511 setting a predetermined determination criterion that is set in advance via the operation unit/display unit 515 to the determination unit 527.

At S1004, the control unit 511 displays the inspection results on the operation unit/display unit 515. Only by simply displaying the final determination results image, which is the inspection processing results, it is difficult to grasp what kind of image anomaly has occurred, and therefore, the final determination results image is composed with the scanned image and the composite image is displayed on the operation unit/display unit 515. For the composition, any composition scheme may be used as long as the composition scheme makes it possible to easily grasp the position of the image anomaly. For example, the portion of "1" in the final determination results image is displayed in red in the scanned image.

<Detailed Explanation of Collation Determination Processing>

Figure 11:
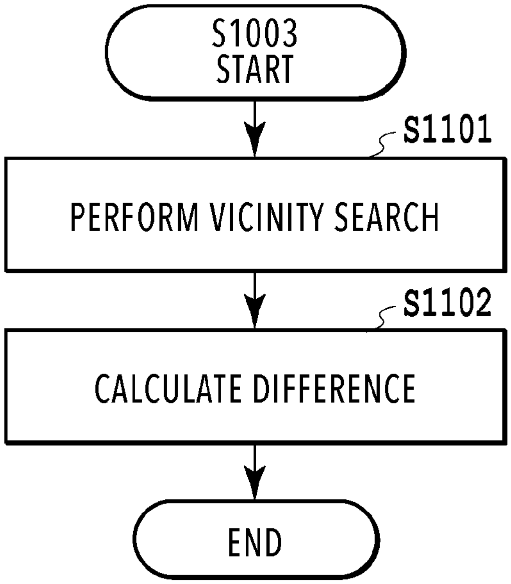
FIG. 11 is a flowchart showing a detailed flow of collation determination processing (S1003)

Next, details of the collation determination processing (S1003) are explained by using the drawing. FIG. 11 is a flowchart showing a detailed flow of the collation determination processing (S1003).

First, at S1101, the collation unit 526 performs highly accurate alignment by the vicinity search in the reference image and in the inspection image. Here, the reason the highly accurate alignment is performed is that although the alignment of the reference image and the inspection image is performed in the image transformation unit 524, it is necessary to further perform local alignment in order to perform defect detection with a high accuracy. In the present embodiment, highly accurate alignment by the vicinity search using block matching is performed.

<Vicinity Search>

Figure 12B:
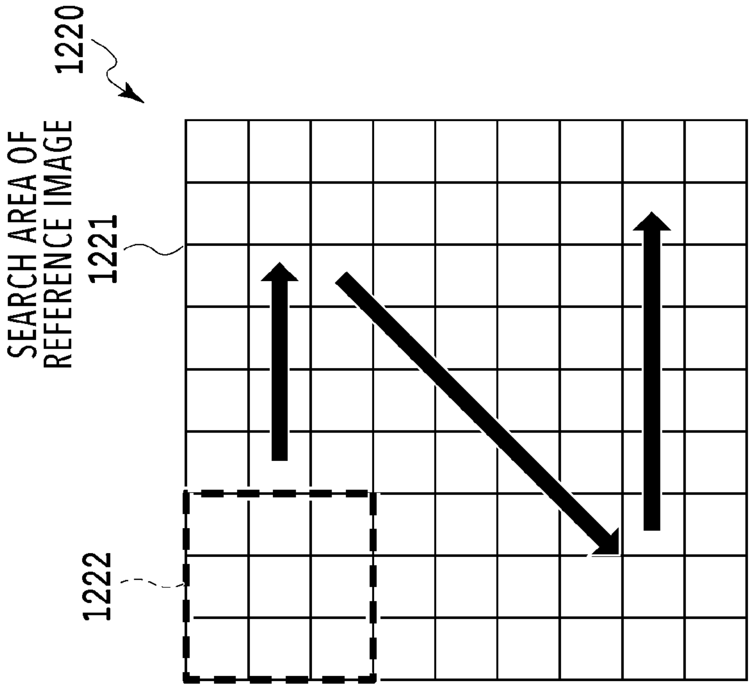
FIG. 12A and FIG. 12B are each a schematic diagram of a vicinity search.
Figure 12A:
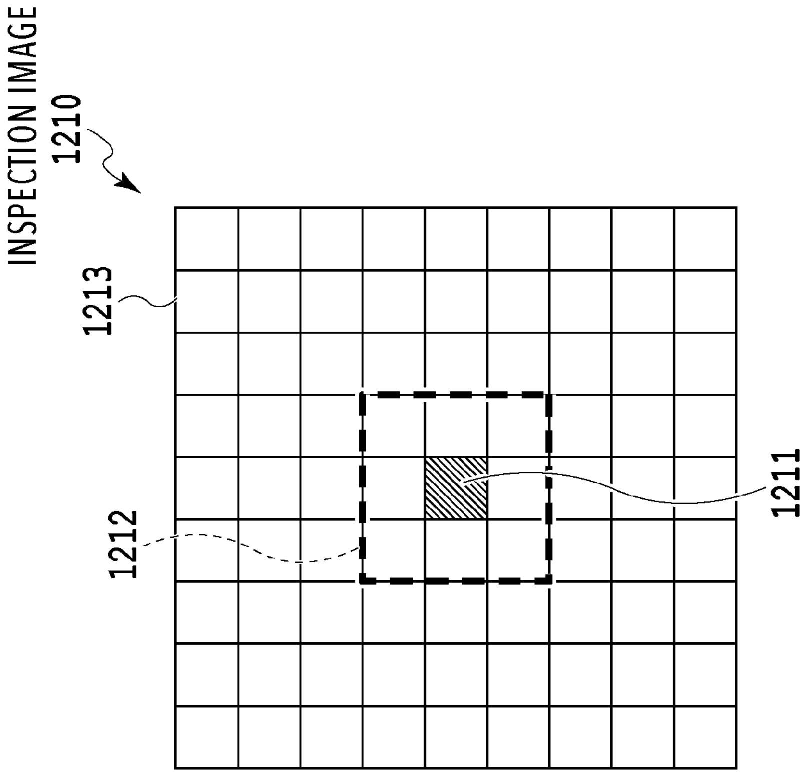

Details of the vicinity search are explained by using the drawings. FIG. 12A and FIG. 12B are each a diagram explaining the vicinity search and FIG. 12A shows an inspection image example and FIG. 12B shows a reference image example. In an inspection image 1210, a pixel 1211 is an inspection-target pixel and a search window 1212 is a target area configured by eight pixels adjacent to and in the vicinity of the pixel 1211.

Based on coordinates (X, Y) of the inspection-target pixel 1211, a search area 1213 is set by taking the coordinates (X, Y) in a reference image 1220 as a center. In the present embodiment, the search area 1213 is taken to be an area including four pixels in the rightward direction and in the leftward direction from the coordinate X and four pixels in the upward direction and in the downward direction from the coordinate Y and each pixel to the right and to the left of the coordinate X. A search area 1221 in the reference image 1220 indicates the search area on the reference image 1220 and has the same coordinates as those of the search area 1213 on the inspection image 1210.

Originally, by the alignment performed in the image transformation unit 524, the pixel of the reference image 1220, which corresponds to the pixel 1211 on the inspection image 1210, exists at the same coordinates, but in a case where local misalignment remains, the corresponding pixel exists misaligned in the vicinity of the original coordinates. Because of that, the search for corresponding pixels is performed for the search area 1221 including the area of the pixels in the vicinity thereof, the area consisting of nine pixels in the horizontal direction and nine pixels in the vertical direction. A search window 1222 shows a search window on the reference image 1220 for calculating a difference from the search window 1212 on the inspection image 1210. While sequentially moving the search window 1222 within the search area 1221, a difference from the search window 1212 is calculated at each of the coordinates and by searching for the coordinates that minimize the difference, the pixel that is the result of the local alignment is obtained. A difference Δ area that is found here is taken to be the total value of a color difference Δ RGB in the target area, which is expressed by formula (2) below.

$$\Delta RGB=\sqrt{\Delta R^2+\Delta G^2+\Delta B^2} \quad (2)$$

At S1102, the collation unit 526 calculates a difference image between the reference image and the scanned image for which alignment has been performed again at S1101. In the present embodiment, ΔG, which is the difference in G of RGB is calculated as a color difference for which a defect is detected. Then, the determination unit 527 determines whether or not a blot on the printed material, for example, such as a streak or a spot-shaped defect, has been detected by using the color difference (difference image) calculated as the collation results and the threshold value.

The scanned image obtained by scanning a printed material is affected by print misalignment during printing and noise during a scan and there is a case where small misalignment remains between the reference image and the scanned image even after the above-described local alignment has been performed. Particularly, in an area in which there is a steep change in luminance, which is represented by a dark portion in the vicinity of an image edge, the difference in luminance caused by misalignment becomes large and further, the noise during a scan is emphasized by an increase in luminance of the dark portion by gamma correction and the variation of luminance is also likely to become large. As a result of that, there is a case where a difference is detected in the image collation processing and despite that no image defect has occurred in the image in fact, there is a possibility that the difference is detected as an image defect. Consequently, by performing the smoothing processing at S604 only for the near-image-edge dark portion area, it is possible to relax the amount of difference in luminance due to misalignment and suppress overdetection. Further, by performing the noise appending processing at S604 only for the near-image-edge dark portion area, it is possible to reproduce the emphasized noise during a scan on the reference image and suppress overdetection. The processing is performed only for the near-image-edge dark portion area, and therefore, it is possible to detect a difference in a pale defect in an area in which the change in luminance is gradual because such a difference is not suppressed.

In the present embodiment, ΔG, which is the difference in G of the RGB values, is taken to be the color difference for which a defect is detected, but it may also be possible to take A RGB as the color difference for which a defect is detected. Further, in a case of a grayscale image, it may also be possible to use the absolute value of the difference between pixel values as the color difference for which a defect is detected, or use the absolute value of the difference that takes into consideration gamma correction.

Here, the difference between the reference image (without correction or corrected (smoothing processing, noise appending processing, or smoothing processing and noise appending processing)) and the scanned image (ideal, misalignment, noise, misalignment and noise) is explained by using the drawings. Note that in order to simplify explanation, it is assumed that in X 11 to X20, which are coordinates in the X-axis direction, the luminance value takes a value between 0 and 255 and 0 indicates the dark portion and 255 indicates the bright portion. In the Y-axis direction, it is possible to obtain the corrected reference image by performing the same processing as that in the X-axis direction, and therefore, explanation of the Y-axis direction is omitted. It is also assumed that the at the coordinate before the coordinate X11, the area is the dark portion area and at the coordinate after the coordinate X20, the area is the bright portion area and the inspection threshold value is taken to be the difference being 100 or more in two successive pixels. In FIG. 13A to FIG. 16C, to be described later, the luminance values of the reference image and the scanned image are represented by the shading of the images corresponding to the luminance values described in tables. Further, the image in the row under the row of the coordinates X11 to X20 represents the image corresponding to the reference image in the table on the left side and the image in the row under the row of the reference image represents the image corresponding to the scanned image in the table on the left side. Furthermore, "x" under the rows of the images indicates the pixel whose difference between the reference image and the scanned image is 100 or more. In the field of smoothing, the data after the smoothing processing is shown, which uses the filter shown in FIG. 9 in the transverse direction (X-axis direction) as the smoothing filter coefficient. Further, in the field of noise appending, the data after the processing to append nose of a random number whose amplitude width is 0 to 100 is performed is shown. Furthermore, in the field of "smoothed→noise appended", the data after performing the same noise appending processing as that performed for the field of noise appending after performing the same smoothing processing as that performed for the field of smoothing is shown.

Figure 13A:
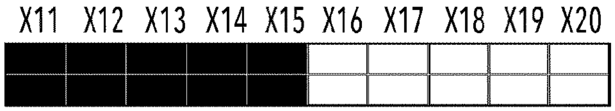
FIG. 13A to FIG. 13D are each a diagram showing a difference example from a scanned image in a case where a reference image (without correction) is used.
Figure 13B:
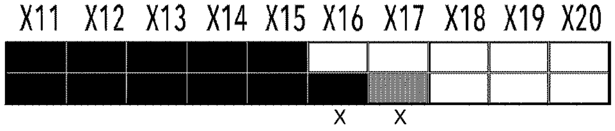
Figure 13C:
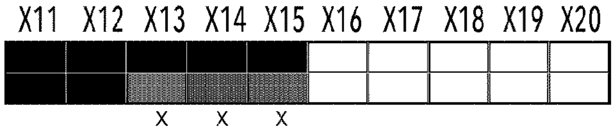
Figure 13D:
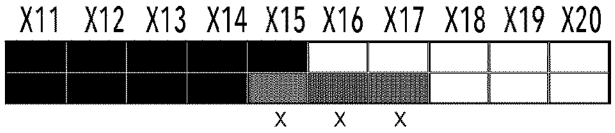

First, the difference from the scanned image in a case where the reference image (without correction) is used is explained. FIG. 13A to FIG. 13D are each a diagram showing a difference example from the scanned image in a case where the reference image (without correction) is used. FIG. 13A shows the difference between the reference image (without correction) and the scanned image (ideal). FIG. 13B shows the difference between the reference image (without correction) and the scanned image (misalignment). FIG. 13C shows the difference between the reference image (without correction) and the scanned image (noise). FIG. 13D shows the difference between the reference image (without correction) and the scanned image (misalignment and noise).

As shown in FIG. 13A, in a case of the scanned image (ideal) in the ideal state, there is no difference from the reference image (without correction), but as shown in the following, depending on the state of the scanned image, there is a case where the difference becomes a difference including an element that is erroneously detected as a blot on a printed material. For example, as shown in FIG. 13B, in a case of the scanned image (misalignment) in which misalignment has occurred, in the difference from the reference image (without correction), there are two successive pixels whose difference in the luminance value is 100 or more. As shown in FIG. 13C, in a case of the scanned image (noise) in which noise has occurred, in the difference from the reference image (without correction), there are three successive pixels whose difference in the luminance value is 100 or more. As shown in FIG. 13D, in a case of the scanned image (misalignment+noise) in which misalignment and noise have occurred, in the difference from the reference image (without correction), there are three successive pixels whose difference in the luminance value is 100 or more.

Consequently, as described above, in a case where the pixel values of pixels configuring a predetermined area including an edge are corrected in the reference image, the following results are obtained.

Figure 14A:
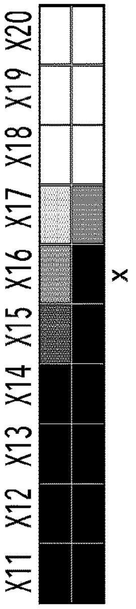
FIG. 14A to FIG. 14C are each a diagram showing a difference example from a scanned image in a case where a reference image (smoothed) is used.
Figure 14B:
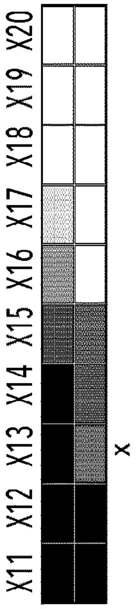
Figure 14C:
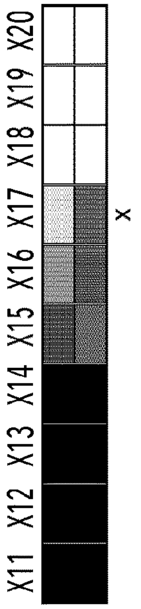

The difference from the scanned image in a case where the reference image (corrected (smoothing processing)) is used is explained. FIG. 14A to FIG. 14C are each a diagram showing a difference example from the scanned image in a case where the reference image (corrected (smoothing processing)) is used. FIG. 14A shows the difference between the reference image (corrected (smoothing processing)) and the scanned image (misalignment). FIG. 14B shows the difference between the reference image (corrected (smoothing processing)) and the scanned image (noise). FIG. 14C shows the difference between the reference image (corrected (smoothing processing)) and the scanned image (misalignment and noise).

As shown in FIG. 14A, even in a case of the scanned image (misalignment) in which misalignment has occurred, in the difference from the reference image (smoothed) for which smoothing processing has been performed, there is only one pixel whose difference in the luminance value is 100 or more. As shown in FIG. 14B, even in a case of the scanned image (noise) in which noise has occurred, in the difference from the reference image (smoothed) for which smoothing processing has been performed, there is only one pixel whose difference in the luminance value is 100 or more. As shown in FIG. 14C, even in a case of the scanned image (misalignment+noise) in which misalignment and noise have occurred, in the difference from the reference image (smoothed) for which smoothing processing has been performed, there is only one pixel whose difference in the luminance value is 100 or more.

As above, it has been confirmed that the difference becomes a difference not including an element that is erroneously detected as a blot on a printed material by performing smoothing processing for the reference image.

Figure 15A:
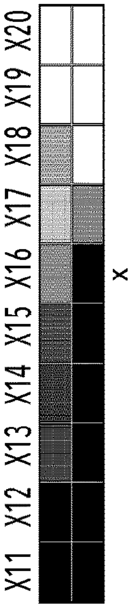
FIG. 15A to FIG. 15C are each a diagram showing a difference example from a scanned image in a case where a reference image (noise appended) is used.
Figure 15B:
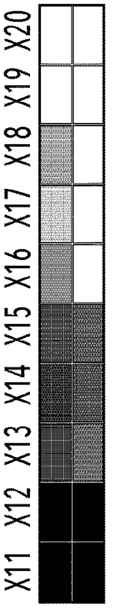
Figure 15C:
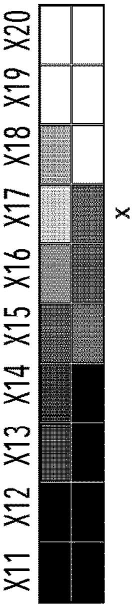

Following the above, the difference from the scanned image in a case where the reference image (corrected (noise appending processing)) is used is explained. FIG. 15A to FIG. 15C are each a diagram showing a difference example from the scanned image in a case where the reference image (corrected (noise appending processing)) is used. FIG. 15A shows the difference between the reference image (corrected (noise appending processing)) and the scanned image (misalignment). FIG. 15B shows the difference between the reference image (corrected (noise appending processing)) and the scanned image (noise). FIG. 15C shows the difference between the reference image (corrected (noise appending processing)) and the scanned image (misalignment and noise).

As shown in FIG. 15A, even in a case of the scanned image (misalignment) in which misalignment has occurred, in the difference from the reference image (noise appended) for which noise appending processing has been performed, there is only one pixel whose difference in the luminance value is 100 or more. As shown in FIG. 15B, even in a case of the scanned image (noise) in which noise has occurred, in the difference from the reference image (noise appended) for which noise appending processing has been performed, there is not a single pixel whose difference in the luminance value is 100 or more. As shown in FIG. 15C, even in a case of the scanned image (misalignment+noise) in which misalignment and noise have occurred, in the difference from the reference image (noise appended) for which noise appending processing has been performed, there is only one pixel whose difference in the luminance value is 100 or more.

As above, it has been confirmed that the difference becomes a difference not including an element that is erroneously detected as a blot on a printed material by performing noise appending processing for the reference image.

Figure 16A:
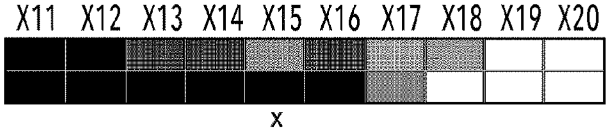
FIG. 16A to FIG. 16C are each a diagram showing a difference example from a scanned image in a case where a reference image (smoothed+noise appended) is used.
Figure 16B:
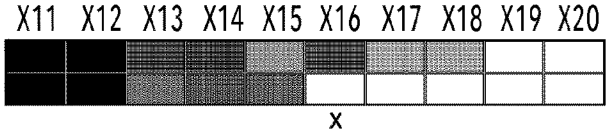
Figure 16C:
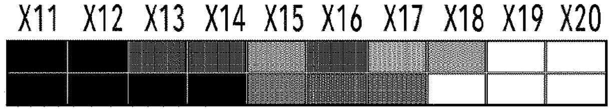

Lastly, the difference from the scanned image in a case where the reference image (corrected (smoothing processing and noise appending processing)) is used is explained. FIG. 16A to FIG. 16C are each a diagram showing a difference example from the scanned image in a case where the reference image (corrected (smoothing processing and noise appending processing)) is used. FIG. 16A shows the difference between the reference image (corrected (smoothing processing and noise appending processing)) and the scanned image (misalignment). FIG. 16B shows the difference between the reference image (corrected (smoothing processing and noise appending processing)) and the scanned image (noise). FIG. 16C shows the difference between the reference image (corrected (smoothing processing and noise appending processing)) and the scanned image (misalignment and noise).

As shown in FIG. 16A, even in a case of the scanned image (misalignment) in which misalignment has occurred, in the difference from the reference image (smoothed noise appended) for which smoothing processing and noise appending processing have been performed, there is only one pixel whose difference in the luminance value is 100 or more. As shown in FIG. 16B, even in a case of the scanned image (noise) in which noise has occurred, in the difference from the reference image (smoothed→noise appended) for which smoothing processing and noise appending processing have been performed, there is only one pixel whose difference in the luminance value is 100 or more. As shown in FIG. 16C, even in a case of the scanned image (misalignment+noise) in which misalignment and noise have occurred, in the difference from the reference image (smoothed→noise appended) for which smoothing processing and noise appending processing have been performed, there is not a single pixel whose difference in the luminance value is 100 or more.

As above, it has been confirmed that the difference becomes a difference not including an element that is erroneously detected as a blot on a printed material by correcting the pixel values of pixels configuring the near-image-edge dark portion area (predetermined area including edge) of the reference image by smoothing processing and noise appending processing.

As explained above, according to the present embodiment, by performing smoothing processing and noise appending processing in advance for the near-image-edge dark portion area in the reference image, it is possible to suppress overdetection of a streak, a spot-shaped defect and the like. That is, by correcting the pixel values of pixels configuring the dark portion area in the vicinity of the image edge of the reference image and relaxing the influence of misalignment and noise during a scan, it is possible to suppress overdetection of a streak and a spot-shaped defect in the near-image-edge dark portion area. As a result of that, it is possible to also inspect the near-image-edge dark portion area for an image defect without reducing the inspection sensitivity.

Second Embodiment

The image processing system including the inspection apparatus according to the present embodiment is explained by using the drawings. In the present embodiment, an aspect is explained in which the correction amount of smoothing processing and noise appending processing is determined based on the scanned image of a calibration chart. In the present embodiment, differences from the first embodiment are explained mainly.

<Calibration Unit 528>

The calibration unit 528 according to the present embodiment matches image edge reproducibility and noise reproducibility between the RIP image (reference image) and the scanned image (inspection image). Because of this, the calibration unit 528 is a module that determines correction parameters (image edge correction parameters) used in correction processing (image edge correction processing) in the image quality difference adjustment unit 522. The calibration unit 528 determines correction parameters based on the reference image used for printing of a calibration chart, to be described later, and the scanned image generated by reading the calibration chart, which is received by the image input unit 512. Details of calibration chart processing will be described later.

<Calibration Chart>

Figure 17B:
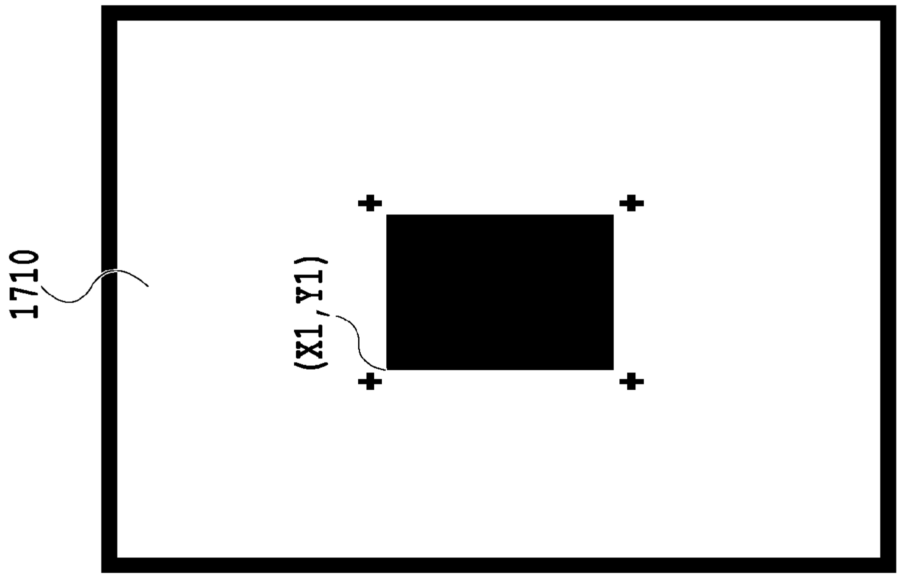
FIG. 17A and FIG. 17B are each a schematic diagram of a calibration chart.
Figure 17A:
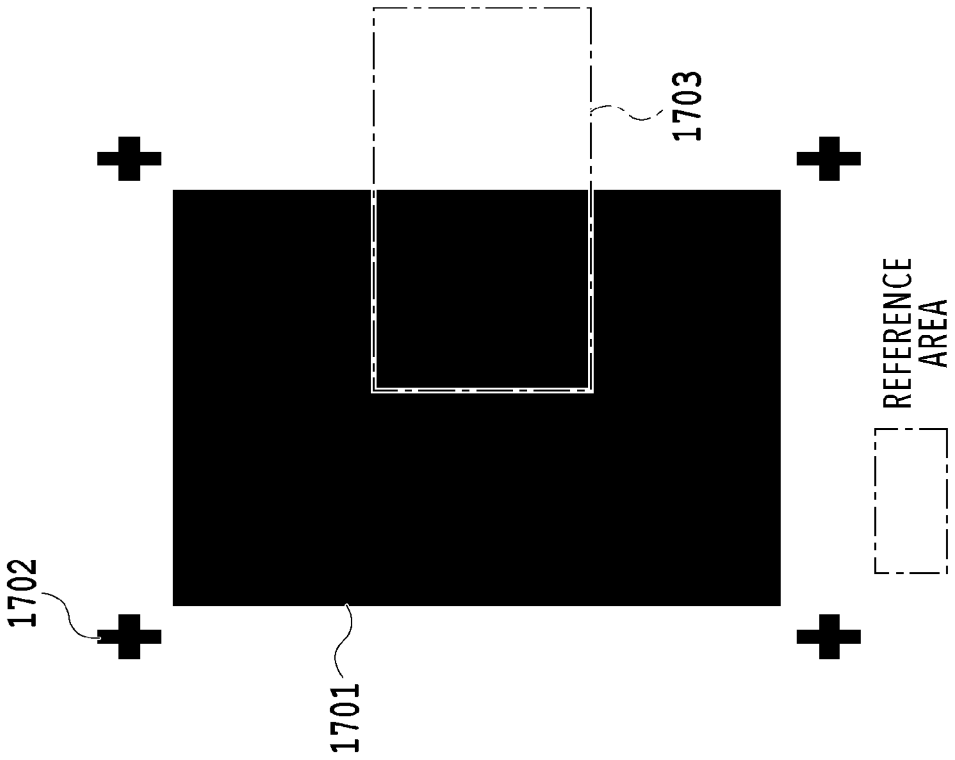

The calibration chart is explained by using the drawings. FIG. 17A and FIG. 17B are each a diagram for explaining the calibration chart, and FIG. 17A shows an example of a patch configuring the calibration chart and FIG. 17B shows a calibration chart example. The calibration chart includes a dark color patch for matching image edge reproducibility and noise reproducibility between the RIP image (reference image) and the scanned image (inspection image).

A dark color patch 1701 configuring the calibration chart is a rectangle of a predetermined size as shown in FIG. 17A. The pixel values (R, G, B) of the dark color patch 1701 are, for example, (0, 0, 0). It may also be possible to change the size of the dark color patch 1701 in accordance with the sheet size. Further, in order to specify the position of the patch in the scanned image of the calibration chart, it may also be possible to arrange a marker 1702 in the calibration chart. Furthermore, the entire area within the dark color patch 1701 is not used and the range that is used actually is taken as a reference area 1703, which is the center portion of the dark color patch 1701 as shown in FIG. 17A. Specifically, the reference area 1703 includes the area corresponding to the dark color patch 1701 and the area corresponding to the background (paper white).

As shown in FIG. 17B, the calibration chart has the dark color patch shown in FIG. 17A, which is arranged at the center. In the present embodiment, it is assumed that the sheet size of the calibration chart is A4, the number of patches is one, and the top-left coordinates of the patch are (X1, Y1). The number of patches and the position at which the patch is arranged are not limited to the examples in FIG. 17A and FIG. 17B. The dark color patch is not limited to the pixel values described above and for example, it may also be possible to arrange each of a plurality of types of dark color patches different from one another, which are configured by other pixel values. Further, in FIG. 17B, the dark color patch is arranged at the center of the calibration chart, but the dark color patch may be arranged at the end of the calibration chart. Furthermore, it may also be possible to arrange a color patch for performing color correction in the calibration chart by utilizing a margin space in which the dark color patch is not arranged.

<Calibration Processing>

The calibration processing according to the present embodiment is explained by using the drawings. Note that it is assumed that the calibration processing according to the present embodiment is performed before the inspection processing is performed. It may also be possible to automatically perform the calibration processing each time before the inspection processing, or perform the calibration processing each time in accordance with user instructions in a case where instructions are given by a user. The calibration processing is not limited to this. For example, it may also be possible to perform the calibration processing according to the present embodiment in calibration processing for adjusting the general hue other than inspection by user instructions via the UI unit 23 in the image forming apparatus 101.

Figure 18:
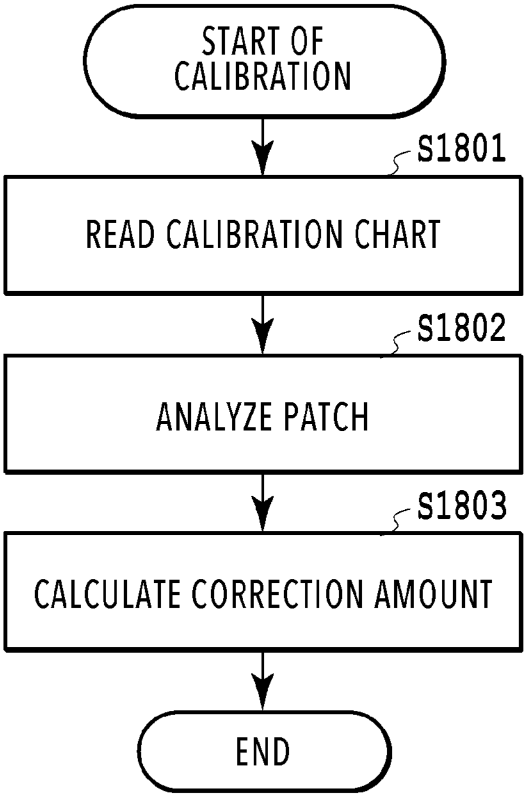
FIG. 18 is a flowchart showing a flow of calibration processing.

FIG. 18 is a flowchart showing a flow of the calibration processing. In the calibration processing, the density of the patch is obtained from the scanned image. The entire flow is stored in the memory unit 514 and performed comprehensively by the control unit 511. Further, the results of the processing of each processing unit are stored in the memory unit 514 and utilized for subsequent processing.

At S1801, the image input unit 512 receives the input of the scanned image of the calibration chart obtained by reading the calibration chart output from the image forming apparatus 101 by the inspection sensor 403.

At S1802, the control unit 511 obtains the patch image corresponding to the reference area described above from the scanned image of the calibration chart read at S1801. The patch image is obtained based on the coordinates (X1, Y1) of the position at which the patch is arranged.

At S1803, the control unit 511 calculates the correction amount from the patch image obtained at S1802.

Figure 19:
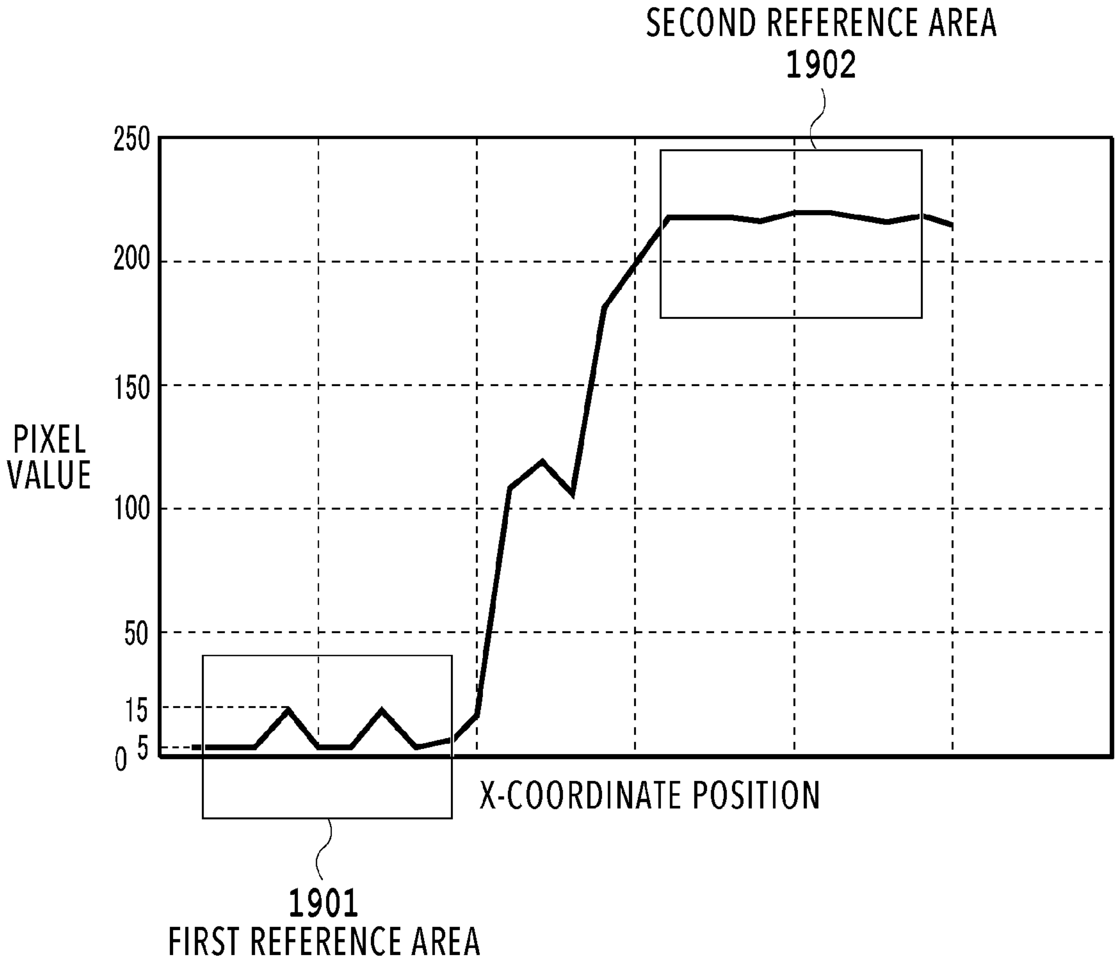
FIG. 19 is a graph showing a pixel value example of a reference area of a calibration chart.

FIG. 19 is a diagram showing the relationship between the pixel value of the patch image obtained at S1802 described previously and the X coordinate. A first reference area 1901 in the patch image is an area corresponding to the dark color patch in the reference area 1703 shown in FIG. 17A. A second reference area 1902 in the patch image is an area corresponding to paper white, which is the portion other than the dark color patch in the reference area 1703. It is assumed that the maximum value of the pixel value of the first reference area 1901 is 15 and the minimum value is 5. The X-coordinates of the first reference area 1901 and the second reference area 1902 are determined based on the coordinates (X1, Y1) of the position at which the dark color patch is arranged.

Figure 20:
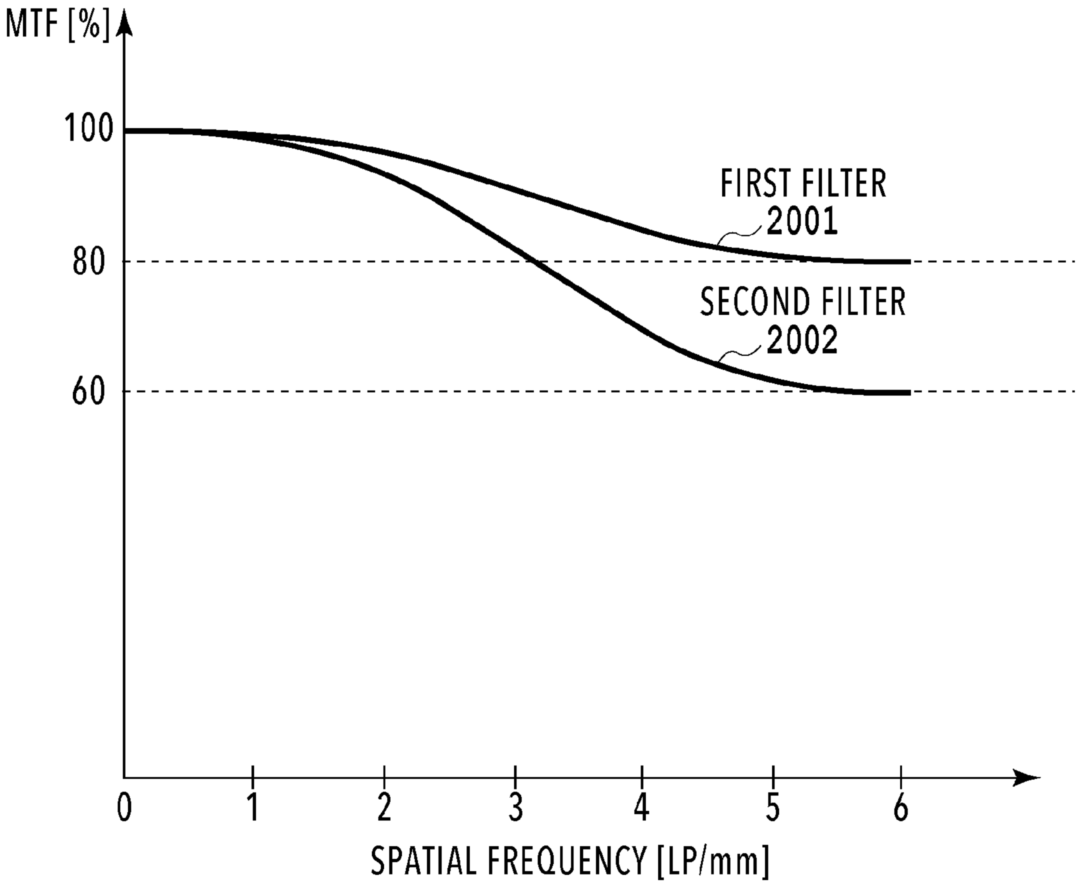
FIG. 20 is a diagram showing a frequency characteristic example of a filter.

FIG. 20 is a diagram showing the frequency characteristic of the filter stored in advance in the memory unit 514. A first filter 2001 is a filter that attenuates to 80% and a second filter 2002 is a filter that attenuates to 60%. The type of filter stored in advance in the memory unit 514 is not limited to this. For example, there may be eight types of filler whose MTF is 20% to 90% in 10% steps, or may be filters whose number of types is smaller than eight.

Here, an example of a determination method of the correction amount of a smoothing filter is described. In the present embodiment, MTF is calculated from the average density of the first reference area 1901 and the average density of the second reference area 1902 and the correction amount of the smoothing filter is determined based on the calculated MTF. For example, in a case where the average density of the first reference area 1901 is 90% and the average density of the second reference area 1902 is 10%, the value shown below will result. That is, MTF (Modulation Transfer Function) is 80% (=90-10), and therefore, under this condition, the first filter 2001 that attenuates to 80% is selected, which is shown in FIG. 20. Further, in a case where the average density of the first reference area 1901 is 70% and the average density of the second reference area 1902 is 10%, MTF is 60% (=70-10), and therefore, under this condition, the second filter 2002 that attenuates to 60% is selected, which is shown in FIG. 20. It is assumed that the filter selected here is used for the RIP image (reference image) in smoothing processing in the image quality difference adjustment unit 522 described in the first embodiment. In a case where the relevant filer does not exist, a filter closest to the numerical value calculated as MTF is selected.

Following the above, an example of the determination method of a noise amplitude amount of noise appending processing is described. In the present embodiment, from the variation of the pixel value of the first reference area 1901, the noise amplitude amount is determined. For example, in a case where the maximum value of the pixel value is 15 and the minimum value of the pixel value is 5 in the first reference area 1901, 10 (=15-5) that is the difference between the maximum value and the minimum value of the pixel vales is determined to be the noise amplitude amount. It is assumed that the noise amplitude amount determined here is used for the RIP image (reference image) in noise appending processing in the image quality difference adjustment unit 522 described in the first embodiment. The determination method of the correction amount is not limited to this. For example, it may also be possible to determine the correction amount based on the standard deviation of the pixel values of the first reference area 1901, or determine based on the value of the variance of the pixel values of the first reference area 1901.

As explained above, according to the present embodiment, the correction amount used in smoothing processing and noise appending processing is determined based on the scanned image of calibration chart. That is, the correction amount is determined in accordance with the surface properties and the whiteness degree of the printing medium. Due to this, it is possible to obtain the operation and effect shown below. That is, by reproducing the correction amount of smoothing processing and noise appending processing different for each printing medium that is printed and causing the reference image and the scanned image to become close to each other, it is possible to suppress overdetection. For example, in a case where the amount of noise in the white color portion is large, it is possible to increase the total amount of noise that is applied and reduce the amount of noise that is additionally applied to the overdetection area.

In the above, the case is explained where the luminance value is corrected by smoothing processing and the pixel value representing the color component is corrected by noise appending processing, but this is not limited. It may also be possible to correct the pixel value representing the color component by smoothing processing. It may also be possible to correct the luminance value by noise appending processing.

In the above, the case is explained where the near-image-edge dark portion area (predetermined area including edge) is extracted from the reference image and smoothing processing and noise appending processing are performed for the extracted near-image-edge dark portion area, but this is not limited. It may also be possible to extract the near-image-edge dark portion area (predetermined area including edge) from the scanned image and perform smoothing processing and noise appending processing for the extracted near-image-edge dark portion area.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present embodiment, it is possible to inspect a predetermined area including an edge in a printed material with a high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-108529, filed Jul. 5, 2022, which is hereby incorporated by reference wherein in its entirety.

What is claimed is:

1. An inspection apparatus that inspects a printed material, comprising:

one or more processors connected to one or more memories, the one or more processors being configured to:

extract a predetermined area including an edge from one of an inspection image obtained by reading the printed material and a reference image that is taken as a reference in the inspection;

perform a first correction to correct a pixel value of a pixel configuring the predetermined area in the inspection image or the reference image, from which the predetermined area has been extracted by the extracting; and detect a blot on the printed material by using collation results of collating the inspection image and the reference image and a threshold value for detecting a blot on the printed material, wherein the detecting detects:

the blot on the printed material by using collation results of collating the reference image in which the pixel value of the pixel in the predetermined area is corrected and the inspection image as the collation results in a case where the pixel value of the pixel in the predetermined area is corrected in the reference image by the first correction.

2. The inspection apparatus according to claim 1, wherein:

the first correction includes correcting the pixel value of the pixel in the predetermined area by performing at least one of smoothing processing using a filter and noise appending processing to append noise.

3. The inspection apparatus according to claim 1, the one or more processors being configured to:

determine a correction amount in a case where the pixel value of the pixel in the predetermined area is corrected by the first correction, wherein the determining determines the correction amount by analyzing a chart image obtained by reading a chart including a dark color patch, which is output by a printing apparatus that performs printing of the printed material and the first correction includes correcting the pixel value of the pixel in the predetermined area based on the determined correction amount.

4. The inspection apparatus according to claim 3, the one or more processors being configured to:

determine the correction amount from an average value of pixel values in an area corresponding to the dark color patch in the chart image and an average value of pixel values in an area corresponding to a portion other than the dark color patch in the chart image, wherein the first correction includes correcting the pixel value of the pixel in the predetermined area by performing smoothing processing using a filter corresponding to the determined correction amount.

5. The inspection apparatus according to claim 3, the one or more processors being configured to:

determine the correction amount from a pixel value of a reference image of the chart and a pixel value of the chart image, wherein the first correction includes correcting the pixel value of the pixel in the predetermined area by performing noise appending processing to append noise corresponding to the determined correction amount.

6. The inspection apparatus according to claim 5, wherein:

the first correction includes correcting the pixel value of the pixel in the predetermined area by performing the noise appending processing to add the noise corresponding to the determined correction amount in a case where the pixel value of the chart image is higher than the pixel value of the reference image of the chart.

7. The inspection apparatus according to claim 5, wherein:

the first correction includes correcting the pixel value of the pixel in the predetermined area by performing the noise appending processing to subtract the noise corresponding to the determined correction amount in a case where the pixel value of the chart image is lower than the pixel value of the reference image of the chart.

8. The inspection apparatus according to claim 3, the one or more processors being configured to:

determine a first correction amount from an average value of pixel values of pixels in an area corresponding to the dark color patch in the chart image and an average value of pixel values of pixels in an area corresponding to a portion other than the dark color patch in the chart image;

determine a second correction amount from a pixel value of a reference image of the chart and a pixel value of the chart image, wherein the first correction includes:

correcting the pixel value of the pixel in the predetermined area by performing smoothing processing using a filter corresponding to the determined first correction amount; and correcting the pixel value of the pixel in the predetermined area by performing noise appending processing to append noise corresponding to the determined second correction amount.

9. The inspection apparatus according to claim 1, the one or more processors being configured to:

convert resolutions of the reference image and the inspection image into a predetermined resolution;

perform color space conversion for the reference image and the inspection image whose resolutions have been converted;

extract the predetermined area including the edge from one of the reference image and the inspection image for which color space conversion has been performed and detect a blot on the printed material by using collation results of collating the inspection image and the reference image by using a vicinity search method and the threshold value.

10. The inspection apparatus according to claim 1, the one or more processors being configured to:

perform a second correction so that there is not a difference in the pixel value between the inspection image and the reference image for an entire area or an area other than the predetermined area of one of the inspection image and the reference image.

11. The inspection apparatus according to claim 10, wherein the second correction is performed before the first correction.

12. The inspection apparatus according to claim 10, wherein the second correction includes performing at least one piece of correction processing of smoothing processing using a filter and noise appending processing to append noise.

13. The inspection apparatus according to claim 1, wherein the detecting detects a streak on the printed material by using the threshold value, wherein the threshold value comprises a threshold for detecting a streak on the printed material.

14. The inspection apparatus according to claim 1, wherein the detecting detects a spot-shaped defect on the printed material by using the threshold value, wherein the threshold value comprises a threshold for detecting a spot-shaped defect on the printed material.

15. An inspection method of inspecting a printed material, the inspection method comprising:

an extraction step of extracting a predetermined area including an edge from one of an inspection image obtained by reading the printed material and a reference image that is taken as a reference in the inspection;

a first correction step of correcting a pixel value of a pixel configuring the predetermined area in the inspection image or the reference image, from which the predetermined area has been extracted at the extraction step; and a detection step of detecting a blot on the printed material by using collation results of collating the inspection image and the reference image and a threshold value for detecting a blot on the printed material, wherein at the detection step:

the blot on the printed material is detected by using collation results of collating the reference image in which the pixel value of the pixel in the predetermined area is corrected and the inspection image as the collation results in a case where the pixel value of the pixel in the predetermined area is corrected in the reference image at the first correction step.

16. A non-transitory computer readable storage medium storing a program for causing a computer to execute an inspection method of inspecting a printed material, the inspection method comprising:

an extraction step of extracting a predetermined area including an edge from one of an inspection image obtained by reading the printed material and a reference image that is taken as a reference in the inspection;

a first correction step of correcting a pixel value of a pixel configuring the predetermined area in the inspection image or the reference image, from which the predetermined area has been extracted at the extraction step; and a detection step of detecting a blot on the printed material by using collation results of collating the inspection image and the reference image and a threshold value for detecting a blot on the printed material, wherein at the detection step:

the blot on the printed material is detected by using collation results of collating the reference image in which the pixel value of the pixel in the predetermined area is corrected and the inspection image as the collation results in a case where the pixel value of the pixel in the predetermined area is corrected in the reference image at the first correction step.

* * * * *